United States Patent
Kobayashi

(10) Patent No.: US 10,353,128 B2
(45) Date of Patent: Jul. 16, 2019

(54) LAMINATED BODY

(71) Applicant: SUMITOMO CHEMICAL COMPANY, LIMITED, Chuo-ku, Tokyo (JP)

(72) Inventor: Tadahiro Kobayashi, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 940 days.

(21) Appl. No.: 14/455,406

(22) Filed: Aug. 8, 2014

(65) Prior Publication Data

US 2015/0041051 A1 Feb. 12, 2015

(30) Foreign Application Priority Data

Aug. 9, 2013 (JP) .................................. 2013-165944

(51) Int. Cl.
*G02B 5/30* (2006.01)

(52) U.S. Cl.
CPC ......... *G02B 5/3083* (2013.01); *G02B 5/3016* (2013.01); *B32B 2457/20* (2013.01);
(Continued)

(58) Field of Classification Search
CPC .. G02B 5/3083; G02B 5/3016; G02B 5/3033; Y10T 428/10; Y10T 428/1036;
(Continued)

(56) References Cited

U.S. PATENT DOCUMENTS 5,780,629 A    7/1998    Etzbach et al.
6,107,427 A    8/2000    Herr et al.
(Continued)

FOREIGN PATENT DOCUMENTS

CN    101416086 A    4/2009
JP    9-506088 A    6/1997
(Continued)

OTHER PUBLICATIONS

Communication dated Apr. 12, 2017 from the State Intellectual Property Office of the P.R.C. in counterpart Application No. 201410381761.6.
(Continued)

*Primary Examiner* — Anthony J Frost
(74) *Attorney, Agent, or Firm* — Sughrue Mion, PLLC

(57) ABSTRACT

Laminated body including a substrate and an optically anisotropic layer. This layer satisfies the following expressions (1), (2), and (3): $\Delta n_{50}(450)/\Delta n_{50}(550) \leq 1.00$ (1), and $1.00 \leq \Delta n_{50}(650)/\Delta n_{50}(550)$ (2) wherein $\Delta n_{50}(450)$, $\Delta n_{50}(550)$ and $\Delta n_{50}(650)$ represent the respective birefringences of the layer that are derived from retardation values of the laminated body that are obtained by measuring the laminated body at wavelengths of 450 nm, 550 nm and 650 nm in the state of inclining the fast axis of the layer at an angle of 50 degrees to act as an inclined central axis; and $n_z > n_x \cong n_y$ (3) wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

9 Claims, 2 Drawing Sheets

(52) U.S. Cl.
CPC ........... *G02B 5/3033* (2013.01); *Y10T 428/10* (2015.01); *Y10T 428/1036* (2015.01)

(58) Field of Classification Search
CPC ............... B32B 2457/20; B32B 37/12; B32B 2457/202; B32B 38/10; B32B 2305/55; B32B 2307/42
See application file for complete search history.

(56) References Cited

U.S. PATENT DOCUMENTS

| | | | |
|---|---|---|---|
| 6,217,792 B1 | 4/2001 | Parri et al. | |
| 6,723,395 B2 | 4/2004 | May et al. | |
| 7,602,462 B2 | 10/2009 | Koishi et al. | |
| 7,995,665 B2 | 8/2011 | Pare, Jr. et al. | |
| 2007/0275186 A1* | 11/2007 | Ashida | C09B 45/28 428/1.31 |
| 2010/0045901 A1* | 2/2010 | Uehira | C07D 277/64 349/75 |
| 2010/0045910 A1* | 2/2010 | Bitou | C02B 5/305 349/118 |
| 2012/0229738 A1 | 9/2012 | Toyama et al. | |
| 2012/0314159 A1 | 12/2012 | Sakai | |

FOREIGN PATENT DOCUMENTS

| | | | |
|---|---|---|---|
| JP | 2000-515496 A | 11/2000 | |
| JP | 2003-137887 A | 5/2003 | |
| JP | 2006-163065 A | 6/2006 | |
| JP | 2006-215221 A | 8/2006 | |
| JP | 2006-268018 A | 10/2006 | |
| JP | 2006-323060 A | 11/2006 | |
| JP | 2007-156439 A | 6/2007 | |
| JP | 2007-176870 A | 7/2007 | |
| JP | 2007-232934 A | 9/2007 | |
| JP | 2007-269639 A | 10/2007 | |
| JP | 2007-269640 A | 10/2007 | |
| JP | 4011652 B2 | 11/2007 | |
| JP | 2010-1284 A | 1/2010 | |
| JP | 4404090 B2 | 1/2010 | |
| JP | 2010-31223 A | 2/2010 | |
| JP | 2010-49230 A | 3/2010 | |
| JP | 4450261 B2 | 4/2010 | |
| JP | 4502119 B2 | 7/2010 | |
| JP | 2010-270108 A | 12/2010 | |
| JP | 2011-6360 A | 1/2011 | |
| JP | 4605016 B2 | 1/2011 | |
| JP | 2011-207765 A | 10/2011 | |
| JP | 2011207765 A | * 10/2011 | |
| JP | 2011207765 A | 10/2011 | |
| JP | 2007-169178 A | 7/2012 | |
| JP | 4985906 B2 | 7/2012 | |
| JP | 2012-255926 A | 12/2012 | |
| WO | 2008/117760 A1 | 10/2008 | |

OTHER PUBLICATIONS

"Liquid Crystal Device Handbook", Chapter 3, 4-3, Chiral Agents for TN and STN, p. 199, edited by Japan Society for the Promotion of Science, 142 Committee, 1989.

"Handbook of Liquid Crystals", Chapter 3.8.6. Network (Fully Cross-Linked), 6.5.1. Liquid Crystal Material, b. Polymerizable Nematic Liquid Crystal Material, edited by Ekisho Binran Henshu Iinkai, Maruzen, Oct. 30, 2000.

Communication dated Jan. 16, 2018 issued by the Taiwanese Intellectual Property Office in counterpart application No. 103126899.

Machine Translation of Notification of Reasons for Refusal for JP 2014-161214 dated Apr. 3, 2018.

Machine Translation of Decision of Refusal for JP 2014-161214 dated Nov. 6, 2018.

* cited by examiner

[Fig. 1]
(a)
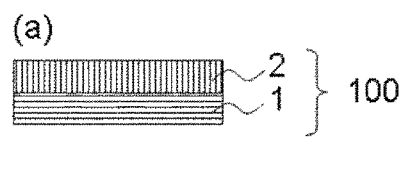
(b)
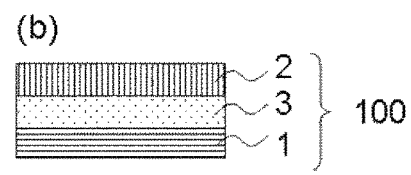
[Fig. 2]
(a)
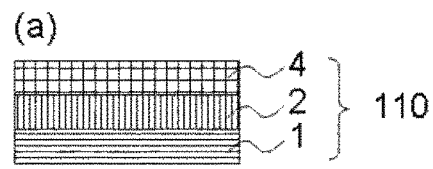
(b)
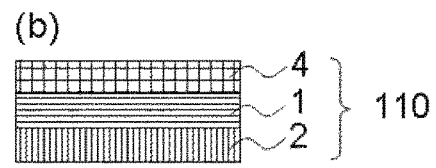
(c)
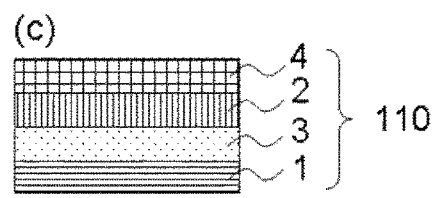
(d)
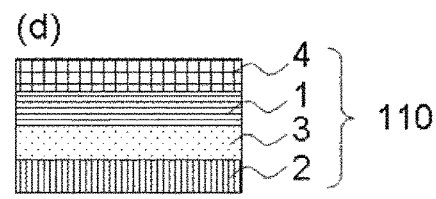

[Fig. 3]
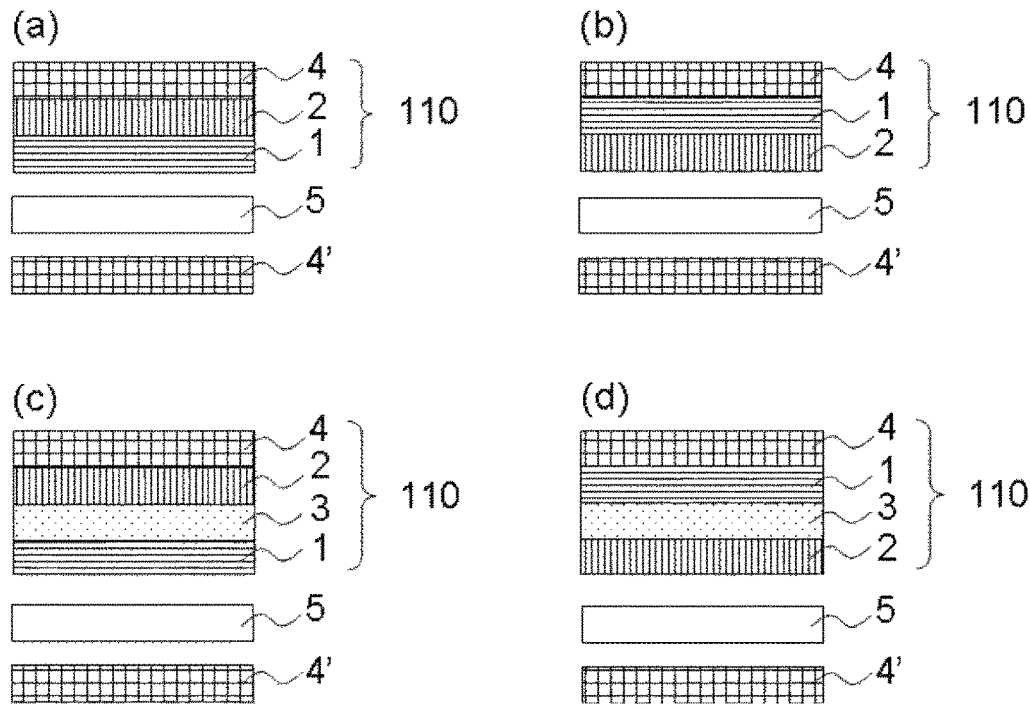
[Fig. 4]
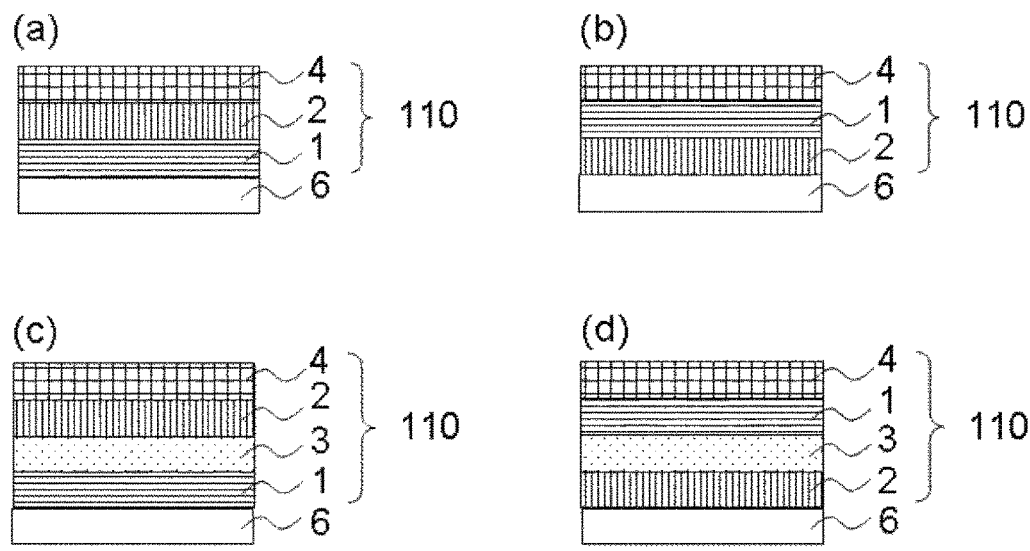

LAMINATED BODY

CROSS REFERENCE TO RELATED APPLICATIONS

This application claims priority based on Japanese Patent Application No. 2013-165944, filed Aug. 9, 2013, the content of which is incorporated herein by reference in its entirety.

BACKGROUND OF THE INVENTION

Field of the Invention

The present invention relates to a laminated body.

Description of the Related Art

A flat panel display device (FPD) makes use of a member including an optical film such as a polarizing plate or a retardation plate. As such an optical film, known is a film produced by applying, onto a substrate, a composition containing a polymerizable liquid crystal compound, a photopolymerization initiator, and a solvent.

For example, Patent Document 1 (JP-A-2006-342332) describes an optical film obtained by applying a composition containing a polymerizable liquid crystal compound onto a substrate, orienting the compound vertically, and then polymerizing the compound.

However, about conventional optical films, light leakage is not sufficiently restrained in the case of viewing a display device in which any one of these films is used from an oblique direction when this device shows black display.

SUMMARY OF THE INVENTION

The present invention is as follows:

[1] A laminated body, comprising a substrate and an optically anisotropic layer, the layer satisfying the following expressions (1), (2), and (3):

$$\Delta n_{50}(450)/\Delta n_{50}(550) \leq 1.00 \quad (1), \text{ and}$$

$$1.00 \leq \Delta n_{50}(650)/\Delta n_{50}(550) \quad (2)$$

wherein $\Delta n_{50}(450)$, $\Delta n_{50}(550)$ and $\Delta n_{50}(650)$ represent the respective birefringences of the optically anisotropic layer that are derived from retardation values of the laminated body that are obtained by measuring the laminated body at wavelengths of 450 nm, 550 nm and 650 nm in the state of inclining the fast axis of the optically anisotropic layer at an angle of 50 degrees to act as an inclined central axis, and $$n_z > n_x \cong n_y \quad (3)$$

wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

[2] The laminated body according to item [1], wherein the optically anisotropic layer comprises a composition comprising a polymerizable liquid crystal compound and a photopolymerization initiator.

[3] The laminated body according to item [1] or [2], comprising an oriented film layer between the substrate and the optically anisotropic layer, the oriented film layer comprising at least one selected from the group consisting of polyimides, polyamides and polyamic acids.

[4] The laminated body according to item [3], wherein the oriented film layer has an orientation regulating force for orienting a polymerizable liquid crystal compound vertically.

[5] The laminated body according to any one of items [1] to [4], wherein in the case of adopting a structure in which a polarizing plate (A), the laminated body according to any one of items [1] to [4], and a polarizing plate (B); are stacked onto each other in this order, making the absorption axis of the polarizing plate (A) orthogonal to that of the polarizing plate (E), and further adopting any one of the following cases (a) and (b):

(a) in a case where the substrate, which partially constitutes the laminated body, has a slow axis inside the plane thereof, this substrate is arranged at the polarizing plate (B) side of the structure and further the substrate is stacked to make the slow axis of the substrate parallel with the absorption axis of the polarizing plate (B), and (b) in a case where the substrate, which partially constitutes the laminated body, has no slow axis inside the plane thereof, this substrate is arranged at the polarizing plate (B) side of the structure, the transmittance T at wavelengths of 550 nm of the structure, this transmittance being obtained when light is radiated into the structure from the polarizing plate (B) side thereof and then the resultant transmitted light is detected from the polarizing plate (A) side thereof, satisfies the following expression (D):

$$0.000 < T < 0.005 \quad (D)$$

wherein the transmittance T is a value relative to the transmittance of a stacked body of the polarizing plates (A) and (B) that is obtained when the polarizing plates (A) and (B) are arranged to make the respective axes thereof parallel with each other, this transmittance being regarded as 100%.

[6] The laminated body according to any one of items [1] to [5], wherein the substrate satisfies the following expression (4):

$$n_x > n_y \cong n_z \quad (4)$$

wherein $n_x$, $n_y$, and $n_z$ have the same meanings as defined above.

[7] The laminated body according to any one of items [1] to [6], wherein the substrate satisfies the following expressions (5) and (6):

$$\Delta n(450)/\Delta n(550) \geq 1.00 \quad (5), \text{ and}$$

$$1.00 \geq \Delta n(650)/\Delta n(550) \quad (6)$$

wherein $\Delta n(450)$, $\Delta n(550)$ and $\Delta n(650)$ represent the respective birefringences of the substrate that are derived from the front retardation values of the laminated body that are obtained by measuring the laminated body at wavelengths of 450 nm, 550 nm, and 650 nm.

[8] The laminated body according to any one of items [1] to [6], wherein the substrate satisfies the following expressions (7; and (8):

$$\Delta n(450)/\Delta n(550) \leq 1.00 \quad (7), \text{ and}$$

$$1.00 \leq \Delta n(650)/\Delta n(550) \quad (8)$$

wherein $\Delta n(450)$, $\Delta n(550)$ and $\Delta n(650)$ have the same meanings as defined above.

[9] The laminated body according to any one of items [2] to [8], wherein the polymerizable liquid crystal compound is a compound represented by the following formula (A):

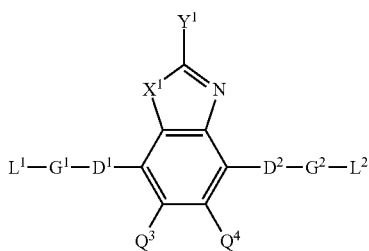

(A)

wherein $X^1$ represents an oxygen atom, a sulfur atom, or —$NR^1$— wherein $R^1$ represents a hydrogen atom, or an alkyl group having 1 to 4 carbon atoms;

$Y^1$ represents a monovalent aromatic hydrocarbon group that has 6 to 12 carbon atoms and may have a substituent, or a monovalent aromatic heterocyclic group that has 3 to 12 carbon atoms and may have a substituent;

$Q^3$ and $Q^4$ each independently represent a hydrogen atom, a monovalent aliphatic hydrocarbon group that has 1 to 20 carbon atoms and may have a substituent, an alicyclic hydrocarbon group having 3 to 20 carbon atoms, a monovalent aromatic hydrocarbon group that has 6 to 20 carbon atoms and may have a substituent, a halogen atom, a cyano group, a nitro group, or —$NR^2R^3$ or —$SR^2$ wherein $R^2$ and $R^3$ each independently represent a hydrogen atom or an alkyl group having 1 to 6 carbon atoms, or $Q^3$ and $Q^4$ may be bonded to each other to form, together with the carbon atom to which each of $Q^3$ and $Q^4$ is bonded, an aromatic ring or an aromatic heterocyclic ring;

$D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, —$NR^4$—$CR^5R^6$—, or —CO—$NR^4$— wherein $R^4$s, $R^5$s, $R^6$s and $R^7$s each independently represent a hydrogen atom, a fluorine atom, or an alkyl group having 1 to 4 carbon atoms;

$G^1$ and $G^2$ each independently represent a bivalent alicyclic hydrocarbon group having 5 to 8 carbon atoms provided that any methylene group partially constituting the alicyclic hydrocarbon group may be replaced by an oxygen atom, a sulfur atom or —NH—, and any methine group partially constituting the alicyclic hydrocarbon group may be replaced by a tertiary nitrogen atom; and $L^1$ and $L^2$ each independently represent a monovalent organic group provided that, at least, one of $L^1$ and $L^2$ is an organic group having a polymerizable group.

[10] A method for producing a laminated body, comprising the following steps (a1) and (a2):

step (a1) of applying a composition comprising a polymerizable liquid crystal compound represented by the formula (A) to a substrate; and step (a2) of drying the applied composition, and radiating light to the composition to cure the composition.

[11] A method for producing a laminated body, comprising the following steps (b1), (b2) and (b3):

step (b1) of applying an orienting polymer to a substrate to form an oriented film layer;

step (b2) of applying a composition comprising a polymerizable liquid crystal compound represented by the formula (A) onto the oriented film layer; and step (b3) of drying the applied composition, and radiating light to the composition to cure the composition.

[12] A polarizing plate, comprising the laminated body recited in any one of items [1] to [9].

[13] A display device, comprising the laminated body recited in any one of items [1] to [9].

[14] A laminated-body-producing method, comprising transferring the optically anisotropic layer of the laminated body recited in any one of items [1] to [5] onto a transfer-receiving substrate to interpose an adhesive between the optically anisotropic layer and the transfer-receiving substrate, thereby yielding a second laminated body comprising the transfer-receiving substrate, a layer of the adhesive, and the optically anisotropic layer.

[15] A laminated body, comprising a transfer-receiving substrate, and an optically anisotropic layer, the optically anisotropic layer satisfying the following expressions (1), (2) and (3):

$$\Delta n_{50}(450)/\Delta n_{50}(550) \le 1.00 \quad (1), \text{ and}$$

$$1.00 \le \Delta n_{50}(650)/\Delta n_{50}(550) \quad (2)$$

wherein $\Delta n_{50}(450)$, $\Delta n_{50}(550)$ and $\Delta n_{50}(650)$ represent the respective birefringences of the optically anisotropic layer that are derived from retardation values of the laminated body that are obtained by measuring the laminated body at wavelengths of 450 nm, 550 nm and 650 nm in the state of inclining the fast axis of the optically anisotropic layer at an angle of 50 degrees to act as an inclined central axis, and $$n_z > n_x \cong n_y \quad (3)$$

wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

According to the laminated body of the present invention, an optical film is obtained which is excellent in light-leakage-restraining performance in the case of viewing a display device making use of this film from an oblique direction when this device shows black display.

BRIEF DESCRIPTION OF THE DRAWINGS

FIGS. 1A and 1B are each a schematic sectional view illustrating an example of the laminated body of the present invention;

FIGS. 2A to 2D are each a schematic sectional view illustrating an example of a polarizing plate including a laminated body of the invention;

FIGS. 3A to 3D are each a schematic sectional view illustrating an example of a liquid crystal display device having a laminated body of the invention; and FIGS. 4A to 4D are each a schematic sectional view illustrating an example of an organic EL display device having a laminated body of the invention.

DETAILED DESCRIPTION OF THE PREFERRED EMBODIMENTS

Hereinafter, the present invention will be described with reference to the drawings.

The present invention is a laminated body having a substrate and an optically anisotropic layer, this layer satisfying the following expressions (1), (2) and (3):

$$\Delta n_{50}(450)/\Delta n_{50}(550) \le 1.00 \quad (1), \text{ and}$$

$$1.00 \le \Delta n_{50}(650)/\Delta n_{50}(550) \quad (2)$$

wherein $\Delta n_{50}(450)$, $\Delta n_{50}(550)$ and $\Delta n_{50}(650)$ represent the respective birefringences of the optically anisotropic layer that are derived from retardation values of the laminated body that are obtained by measuring the laminated body at wavelengths of 450 nm, 550 nm and 650 nm in the state of inclining the fast axis of the optically anisotropic layer at an angle of 50 degrees to act as an inclined central axis, and $$n_z > n_x \cong n_y$$

wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

About the laminated body of the present invention (referred to also as the present laminated body hereinafter), the optically anisotropic layer is preferably a hind of optically anisotropic layer that is even in composition and optical property.

The substrate is usually a transparent substrate. The transparent substrate means a substrate having such a translucency that the substrate can transmit light, in particular, visible rays. Transparency denotes a property of that the transmittance of any object or member through light rays having wavelengths from 380 to 780 nm is 80% or more. Specific examples of the transparent substrate include a glass piece, and a translucent resin substrate. The latter is preferred. The substrate may be usually a substrate in a film form, and is preferably a film in a roll form.

Examples of the resin that constitutes the substrate include polyolefins such as polyethylene, polypropylene, and norbornene-based polymers; polyvinyl alcohol; polyethylene terephthalate; polymethacrylates; polyacrylates; cellulose esters; polyethylene naphthalate; polycarbonates; polysulfones; polyethersulfones; polyetherketones; polyphenylenesulfides; and polyphenylene oxides. Of these examples, preferred are polyolefins such as polyethylene, polypropylene and norbornene-based polymers for the substrate.

The substrate may be subjected to surface treatment. Examples of the method for the surface treatment include a method I) of treating a surface of the substrate with corona or plasma in a vacuum or in the atmosphere; a method II) of treating a surface of the substrate with a laser; a method of treating a surface of the substrate with ozone; a method III) of subjecting a surface of the substrate to saponifying treatment or flame treatment; a method IV) of painting a coupling agent onto a surface of the substrate; a method V) of subjecting a surface of the substrate to primer treatment; and a graft polymerization method VI) of causing a reactive monomer or a polymer having reactivity to adhere onto a surface of the substrate, and then radiating radial rays, plasma or ultraviolet rays thereto to cause a react ion of the monomer or polymer. Of these examples, the method I) is preferred.

The method I) is, for example, a method i) of setting the substrate between opposed electrodes under a pressure close to the atmospheric pressure, and then generating corona or plasma to conduct surface treatment of the substrate therewith; a method ii) of causing a gas to flow into the gap between opposed electrodes, making the gas into plasma between the electrodes, and blowing the plasma-state gas onto the substrate; or a method iii) of generating glow discharge plasma under a low pressure to conduct surface treatment of the substrate therewith.

Of these methods, preferred are the methods i) and ii). Usually, these surface treatments with corona or plasma can be conducted in a commercially available surface treatment apparatus.

The optically anisotropic: layer that the laminated body of the present invention has satisfies the following expressions (1), (2) and (3):

$$\Delta n_{50}(450)/\Delta n_{50}(550) \leq 1.00 \tag{1, and}$$

$$1.00 \leq \Delta n_{50}(650)/\Delta n_{50}(550) \tag{2}$$

wherein $\Delta n_{50}(450)$, $\Delta n_{50}(550)$ and $\Delta n_{50}(650)$ represent the respective birefringences of the optically anisotropic layer that are derived from retardation values of the laminated body that are obtained by measuring the laminated body at wavelengths of 450 nm, 550 nm and 650 nm in the state of inclining the fast axis of the optically anisotropic layer at an angle of 50 degrees to act as an inclined central axis, and $$n_z > n_x \cong n_y \tag{3}$$

wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

The expressions (1) and (2) denote wavelength dispersion characteristics in the thickness direction (z direction) of the optically anisotropic layer. $\Delta n_{50}(\lambda)$ can be calculated out in accordance with the following equation (z-1), using the thickness d of the optically anisotropic layer, and the retardation value $R_{50}(\lambda)$ of the laminated body that is obtained by measuring the laminated body at a wavelength $\lambda$ nm in the state of inclining the fast axis of the optically anisotropic layer at an angle of 50 degrees to act as an inclined central axis:

$$\Delta n_{50}(\lambda) = R_{50}(\lambda)/d \tag{z-1}$$

The matter that the optically anisotropic layer satisfies the expressions (1) and (2) denotes that this layer shows such a reverse wavelength dispersion characteristic that this layer shows a larger birefringence as light having a longer wavelength is radiated to the layer.

The optically anisotropic layer is usually a coat layer obtained by applying a solution thereto and drying the applied solution. The solution may be a composition which contains a polymerizable liquid crystal compound and a photopolymerization initiator (hereinafter referred to also as an optically-anisotropic-layer-forming composition).

The polymerizable liquid crystal compound is, for example, a compound represented by a formula (A) illustrated below (hereinafter, this compound may be referred to as the "compound (A)"). The polymerizable liquid crystal compound may be a single species thereof, or a combination of plural species having different structures.

The compound (A) may be a compound described in JP-A-2011-207765. The compound (A) may be specifically the following:

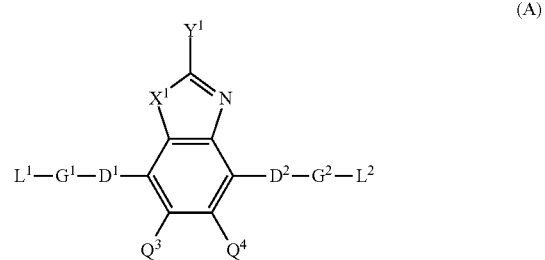

(A)

wherein:
$X^1$ represents an oxygen atom, a sulfur atom, or —$NR^1$— wherein $R^1$ represents a hydrogen atom, or an alkyl group having 1 to 4 carbon atoms;

Y¹ represents a monovalent aromatic hydrocarbon group that has 6 to 12 carbon atoms and may have a substituent, or a monovalent aromatic heterocyclic group that has 3 to 12 carbon atoms and may have a substituent;

$Q^3$ and $Q^4$ each independently represent a hydrogen atom, a monovalent aliphatic hydrocarbon group that has 1 to 20 carbon atoms and may have a substituent, an all cyclic hydrocarbon group having 3 to 20 carbon atoms, a monovalent aromatic hydrocarbon group that has 6 to 20 carbon atoms and may have a substituent, a halogen atom, a cyano group, a nitro group, or —NR²R³ or —SR² wherein R² and R³ each independently represent a hydrogen atom or an alkyl group having 1 to 6 carbon atoms, or $Q^3$ and $Q^4$ may be bonded to each other to form, together with the carbon atom to which each of $Q^3$ and $Q^4$ is bonded, an aromatic ring or an aromatic heterocyclic ring;

$D^1$ and $D^2$ each independently represent a single bond, —C(=O)—O—, —C(=S)—O—, —CR⁴R⁵—, —CR⁴R⁵—CR⁶R⁷—, —O—CR⁴R⁵—, —CR⁴R⁵—O—CR⁶R⁷—, —CO—O—CR⁴R⁵—, —O—CO—CR⁴R⁵—, —CR⁴R⁵—O—CO—CR⁶R⁷—, —CR⁴R⁵—CO—O—CR⁶R⁷—, —NR⁴—CR⁵R⁶—, or —CO—NR⁴— wherein R⁴s, R⁵s, R⁶s and R⁷s each independently represent a hydrogen atom, a fluorine atom, or an alkyl group having 1 to 4 carbon atoms;

$G^1$ and $G^2$ each independently represent a bivalent alicyclic hydrocarbon group having 5 to 8 carbon atoms provided that any methylene group partially constituting the alicyclic hydrocarbon groups may be replaced by an oxygen atom, a sulfur atom or —NH—, and any methine group partially constituting the alicyclic hydrocarbon group may be replaced by a tertiary nitrogen atom; and $L^1$ and $L^2$ each independently represent a monovalent organic group provided that at least one of $L^1$ and $L^2$ has a polymerizable group. The polymerizable liquid crystal compound is preferably a compound represented by the formula (A) in which $L^1$ is a group represented by the following formula (A¹) and $L^2$ is a group represented by the following formula (A²):

(A1), and

(A2)

wherein $B^1$, $B^2$, $E^1$ and $E^2$ each independently represent —CR⁴R⁵— wherein R⁴ and R⁵ each independently represent a hydrogen atom, a fluorine atom or an alkyl group having 1 to 4 carbon atoms. CH₂—CH₂—, —O—, —S—, —CO—O—, —O—CO—O—, —CS—O—, —O—CS—O—, —CO—NR¹—, —O—CH₂, —S—CH₂—, or a single bond.

In these formulae, A¹ and A² each independently represent a bivalent alicyclic hydrocarbon group having 5 to 8 carbon atoms or a bivalent aromatic hydrocarbon group having 6 to 18 carbon atoms provided that any methylene group partially constituting the alicyclic hydrocarbon group may be replaced by an oxygen atom, a sulfur atom; or —NH—, and any methine group partially constituting the alicyclic hydrocarbon group may be replaced by a tertiary nitrogen atom.

In these formulae, k and l each independently represent an integer of 0 to 3,

F¹ and F² each independently represent a bivalent aliphatic hydrocarbon group having 1 to 12 carbon atoms, P¹ represents a polymerizable group, and P² represents a hydrogen atom or a polymerizable group.

The content of the polymerizable liquid crystal compound in the optically-anisotropic-layer-forming composition is usually from 5 to 50 parts by mass, preferably from 10 to 30 parts by mass for 100 parts by mass of this composition.

The photopolymerization initiator is, for example, a substance that generates radicals by irradiation with light.

Examples of the photopolymerization initiator include benzoin compounds, benzophenone compounds, benzyl ketal compounds, α-hydroxyketone compounds, α-aminoketone compounds, α-acetophenone compounds, triazine compounds, iodonium salts and sulfonium salts. Specific examples thereof include products Irgacure (registered trademark) 907, 184, 651, 819, 250 and 369 (all the products are manufactured by BASF Japan Ltd.); Seikuol (registered trademark) BZ, Z, BEE (all the products are manufactured by Seiko Chemical Co., Ltd.); Kayacure (registered trademark) BP100 (manufactured by Nippon Kayaku Co., Ltd.); Kayacure UV1-6992 (manufactured by the Bow Chemical Co.); Adekaoptoimer (registered trademark) SP-152, and SP-170 (all the products are manufactured by Adeka Corp.); TAZ-A and TAZ-PP (all the products are manufactured by Nihon Siber Hegner K.K.), and TAZ-104 (manufactured by Sanwa Chemical Co., Ltd.). Of these examples, preferred are α-acetophenone compounds. Examples of the α-acetophenone compounds include 2-methyl-2-morpholino-1-(4-methylsulfanylphenyl)propane-1-one, 2-dimethylamino-1-(4-morpholinophenyl)-2-benzylbutane-1-one, 2-dimethylamino-1-(4-morpholinophenyl)-2-(4-methylphenyl methyl)butane-1-one. Preferred are 2-methyl-2-morpholino-1-(4-methylsulfanylphenyl)propane-1-one, and 2-dimethylamino-1-(4-morpholinophenyl)-2-benzylbutane-1-one. Commercially available product examples of the α-acetophenone compounds include products Irgacure (registered trademark) 369, 379EG, and 907 (all the product are manufactured by BASF Japan Ltd.), and Seikuol (registered trademark) BEE (manufactured by Seiko Chemical Co., Ltd.).

The amount of the photopolymerization initiator is usually from 0.1 to 30 parts by mass, preferably from 0.5 to 10 parts by mass for 100 parts by mass of the polymerizable liquid crystal compound. When the amount is in the range, the polymerizable liquid crystal compound can be polymerized without disturbing the liquid crystal orientation of this compound.

The optically-anisotropic-layer-forming composition may further contain a polymerization inhibitor, a photosensitizer, a levelling agent, a chiral agent, a reactive addition, a solvent and/or some other.

[Polymerization Inhibitor]

The optically-anisotropic-layer-forming composition may contain a polymerization inhibitor to control the polymerization reaction of the polymerizable liquid crystal compound.

Examples of the polymerization inhibitor include hydroquinone and hydroquinone analogues each having, as a substituent, an alkyl ether; catechol compounds each having, as a substituent, an alkyl ether, such as butylcatechol; radical capturing agents such as pyrogallol compounds, and 2,2,6,6-tetramethyl-1-piperidinyloxy radicals; thiophenol compounds; β-naphthylamine compounds; and β-naphthol compounds.

The content of the polymerization inhibitor in the optically-anisotropic-layer-forming composition is usually from 0.1 to 30 parts by mass, preferably from 0.5 to 10 parts by mass for 100 parts by mass of the polymerizable liquid crystal compound therein. When the content is in the range, the polymerizable liquid crystal compound can be polymerized without disturbing the polymerizable liquid crystal orientation of this compound.

[Photosensitizer]

Examples of the photosensitizer include xanthone, and xanthone analogues such as thioxanthone; anthracene, and anthracene analogues such as anthracene having a substituent such as an alkylether group; phenothiazine; and rubrene.

The use of the photosensitizer makes it possible to make the sensitivity of the photopolymerization initiator high. The content of the photosensitizer in the composition is usually from 0.1 to 30 parts by mass, preferably from 0.5 to 10 parts by mass for 100 parts by mass of the polymerizable liquid crystal compound.

[Levelling Agent]

Examples of the levelling agent include organic modified silicone oil based and polyacrylate based levelling agents, and perfluoroalkyl-containing levelling agents. Specific examples thereof include products DC3PA, SH7PA, DC11PA, SK28PA, SH29PA, SH30PA, ST80PA, ST86PA, SH8400, SH8700, and FZ2123 (all the products are manufactured by Dow Corning Toray Co., Ltd.); KP321, KP323, KP324, KP326, KP340, KP341, X22-161A, and KF6001 (all the products are manufactured by Shin-Etsu Chemical Co., Ltd.); TSF400, TSF401, TSF410, TSF4300, TSF4440, T3F4445, TSF-4446, TSF4452, and TSF4460 (all the products are manufactured by Momentive Performance Materials Japan LLC); Fluorinert (registered trademark) FC-72, FC-40, FC-43, and FC-3283 (all the products are manufactured by Sumitomo 3M Ltd.); Megafac (registered trademark) R-08, R-30, R-90, F-410, F-411, F-443, F-445, F-470, F-477, F-479, F-482, and F-483 (all the products are manufactured by DIC Corp.); Eftop (tradename) EF301, EF303, EF351, and EF352 (all the products are manufactured by Mitsubishi Material Electronic Chemicals Co., Ltd.); Surflon (registered trademark) S-381, S-382, S-363, S-393, SC-101, SC-105, KH-40, and SA-100 (all the products are manufactured by AGO Seimi Chemical Co., Ltd.); E1330 and E5844 ((tradenames) manufactured by Dalkin Fine Chemical Laboratory, Ltd.); and BM-1000, BM-1100, BYK-352, BYN-353, and BYK-361N ((trade names) manufactured by BM Chemie GmbH). Such levelling agents may be used in any combination of two or more thereof.

The use of the levelling agent makes it possible to yield a smoother optically anisotropic layer, and to control the fluidity of the optically-anisotropic-layer-forming composition or adjust the cross linkage density of the optically anisotropic layer in the production process of the optically anisotropic layer. The content of the levelling agent in the composition is usually from 0.1 to 30 parts by mass, preferably from 0.1 to 10 parts by mass for 100 pares by mass of the polymerizable liquid crystal compound.

[Chiral Agent]

The chiral agent may be a known chiral agent (for example, agents described in "Liquid Crystal Device Handbook", Chapter 3, 4-3, Chiral Agents for TN and STN, p. 199, edited by the Japan Society for the Promotion of Science, Committee No. 142, 1989).

The chiral agent generally contains an asymmetric carbon atom. This chiral agent may be an axially asymmetric compound or planarly asymmetric compound, which contains no asymmetric atom. Examples of the axially asymmetric compound or planarly asymmetric compound include binaphthyl, helicene, paracyclophane, and derivatives of these compounds.

Specific examples of the chiral agent include compounds as described in JP-A-2007-269640, 2007-269639, 2007-176670, 2003-137887, 2000-515496, 2007-169178, and 09-506086. The chiral agent is preferably a product Paliocolor (registered trademark) LC756 manufactured by BASF Japan Ltd.

The chiral agent in the composition is usually from 0.1 to 30 parts by mass, preferably from 1.0 to 25 parts by mass for 100 parts by mass of the liquid crystal compound. When the content is in the range, the liquid crystal orientation of the polymerizable liquid crystal compound can be further restrained from being disturbed when this compound is polymerized.

[Reactive Additive]

The reactive additive is preferably a compound having in the molecule thereof a carbon-carbon unsaturated bond and an active hydrogen reactive group. The wording "active hydrogen reactive group" means a group reactive with a group having an active hydrogen radical such as a carboxyl group (—COOH), hydroxyl group (—OH) or amino group (—NH$_2$). Typical examples thereof include glycidyl, oxazoline, carbodiimide, aziridine, imide, isocyanato, thioisocyanato, and maleic anhydride groups.

It is preferred that the reactive additive has at least two active hydrogen reactive groups. In this case, the active hydrogen reactive groups may be the same or different.

The carbon-carbon unsaturated bond that the reactive additive has may be a carbon-carbon double bond, a carbon-carbon triple bond, or a combination of the two; and is preferably a carbon-carbon double bond. It is particularly preferred that the reactive additive contains, as its carbon-carbon unsaturated bond(s), a vinyl group and/or a (meth) acrylic group. Furthermore, the reactive additive preferably has, as its active hydrogen reactive group (s), at least one selected from the group consisting of epoxy, glycidyl and isocyanato groups, and in particular preferably has an acrylic group and an isocyanato group.

Specific examples of the reactive additive include compounds each having a (meth)acrylic group and an epoxy group, such as methacryloxy glycidyl ether and acryloxy glycidyl ether; compounds each having a (meth)acrylic group and an oxetane group, such as oxetane acrylate and oxetane methacrylate; compounds each having a (meth) acrylic group and a lactone group, such as lactone acrylate and lactone methacrylate; compounds each having a vinyl group and an oxazoline group, such as vinyl oxazoline, and isopropenyl oxazoline; and oligomers each made from a compound having a (meth)acrylic group and an isocyanato group, such as isocyanatomethyl acrylate, isocyanatomethyl methacrylate, 2-isocyanatoethyl acrylate, and 2-isocyanatoethyl methacrylate. Other examples thereof include compounds each having a vinyl group or vinylene group, and an acid anhydride, such as methacrylic anhydride, acrylic anhydride, maleic anhydride, and vinylmaleic anhydride. Of these examples, preferred are methacryloxy glycidyl ether, acryloxy glycidyl ether, isocyanatomethyl acrylate, isocyanatomethyl methacrylate, vinyl oxazoline, 2-isocyanatoethyl acrylate, 2-isocyanatoethyl methacrylate, and the above-mentioned oligomers. Particularly preferred are isocyanatomethyl acrylate, 2-isocyanatoethyl acrylate, and the oligomers.

More preferred examples of the reactive additive having, as its active hydrogen reactive group, an isocyanato group are specifically compounds each represented by the following formula

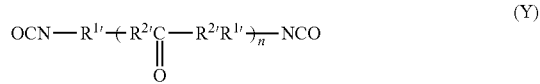

(Y)

wherein n represents an integer of 1 to 10, $R^1$'s each represent a bivalent aliphatic or alicyclic hydrocarbon group having 2 to 20 carbon atoms, or a bivalent aromatic hydrocarbon group having 5 to 20 carbon atoms; and one of two $R^{2'}$ in each of the recurring units is a group represented by —NH— and the other is a group represented by >N—C(=)—$R^{3'}$ wherein $R^{3'}$ represents a hydrogen radical, or a group having a carbon-carbon unsaturated bond.

At least one of $R^{3'}$'s in the formula (Y) is a group having a carbon-carbon unsaturated bond.

Of the reactive additives represented by the formula (Y), particularly preferred is a compound represented by the following formula (YY) in which n has the same meaning as described above (hereinafter the compound may be referred to as the "compound (YY)"):

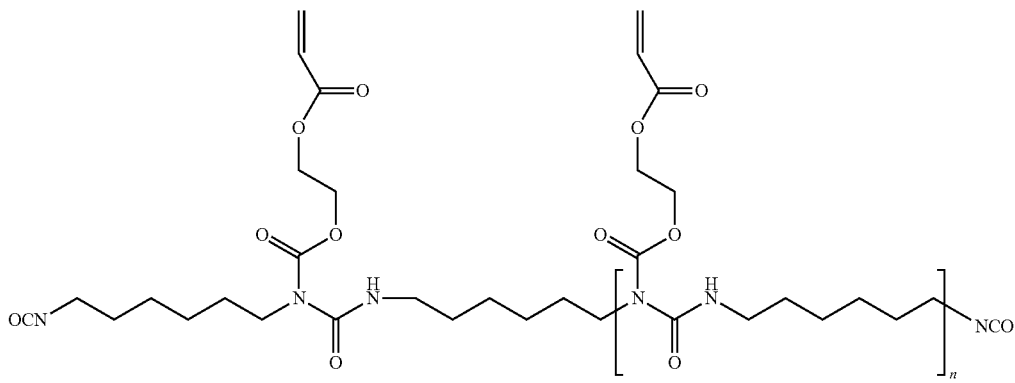

(YY)

As the compound (YY), a commercially available product is usable as it is, or in the state of being purified if necessary. An example of the commercially available product is a product Laromer (registered trademark) LR-9000 (manufactured by the company BASF).

The content of the reactive additive in the composition is usually from 0.1 to 30 parts by mass, preferably from 0.1 to 5 parts by mass for 100 parts by mass of the polymerizable liquid crystal compound.

[Solvent]

The optically-anisotropic-layer-forming composition preferably contains a solvent, in particular, an organic solvent to make the operability of this composition for optically-anisotropic-film production good. The organic solvent is preferably an organic solvent in which the polymerizable liquid crystal compound, and other constituent components for the optically-anisotropic-layer-forming composition are soluble, more preferably a solvent which is inactive to the polymerization reaction of the polymerizable liquid crystal compound and which is one in which the polymerizable liquid crystal compound and the other constituent components, for the optically-anisotropic-layer-forming composition, are soluble. Specific examples thereof include alcohol solvents such as methanol, ethanol, ethylene glycol, isopropyl alcohol, propylene glycol, methylcellosolve, butylcellosolve, propylene glycol monomethyl ether, and phenol; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; non-halogenated aliphatic hydrocarbon solvents such as pentane, hexane and heptane; non-halogenated aromatic hydrocarbon solvents such as toluene, and xylene; nitrile solvents such as acetonitrile; ether solvents such as tetrahydrofuran, and dimethoxyethane; and halogenated hydrocarbon solvents such as chloroform, and chlorobenzene. Such organic solvents may be used in any combination of two or more thereof. Of these examples, preferred are alcohol solvents, ester solvents, ketone solvents, non-halogenated aliphatic hydrocarbon solvents and non-halogenated aromatic hydrocarbon solvents.

The optically-anisotropic-layer-forming composition may further contain a polymerizable liquid crystal compound different from the compound (A).

The polymerizable liquid crystal compound different from the compound (A) may be a single species or a combination of species having different structures, and is, for example, a compound containing a group represented by the following formula (X) (the compound may be referred to as the compound (X) hereinafter):

$$P^{11}\text{—}B^{11}\text{-}E^{11}\text{-}B^{12}\text{-}A^{11}\text{-}B^{13} \quad (X)$$

wherein: $P^{11}$ represents a polymerizable group;

$A^{11}$ represents a bivalent alicyclic hydrocarbon group or bivalent aromatic hydrocarbon group provided that any hydrogen atom; contained in the bivalent alicyclic hydrocarbon group or bivalent aromatic hydrocarbon group may be substituted with a halogen atom, an alkyl group having 1 to 5 carbon atoms, an alkoxy group having 1 to 6 carbon atoms, a cyano group or a nitro group provided that any hydrogen atom contained in the alkyl group having 1 to 6 carbon atoms or the alkoxy group having 1 to 6 carbon atoms may be substituted with a fluoro atom;

$B^{11}$ represents —O—, —S—, —CO—O—, —O—CO—, —O—CO—O—, —CO—$NR^{16}$—, —$NR^{16}$—CO—, —CO—, —CS— or a single bond wherein $R^{16}$s each represent a hydrogen atom or an alkyl group having 1 to 6 carbon atoms (the same applies to the following $R^{16}$s);

$B^{12}$ and $B^{13}$ each independently represent —C≡C—, —CH=CH—, —$CH_2$—$CH_2$—, —O—, —S—, —C(=O)—, —C(=O)—O—, —O—C(=O)—, —O—C(=O)—O—, —CH=N—, —N=CH—, —N=N—, —C(=O)—$NR^{16}$—, —$NR^{16}$—C(=O)—, —$OCH_2$—, —$OCF_2$—, —$CH_2O$—, —$CF_2C$—, —CH=CH—C(=O)—O—, —O—C(=O)—CH=CH— a single bond; and $E^{11}$ represents an alkanediyl group having 1 to 12 carbon atoms provided that any hydrogen atom contained in the alkanediyl group may be substituted with an alkoxy group having 1 to 5 carbon atoms provided that any hydrogen contained in the alkoxy group may be substituted with a halogen atom, and provided that any —CH$_2$— that partially constitutes the alkanediyl group may be replaced with —O— or —CO—.

The number of the carbon atoms of the bivalent aromatic hydrocarbon group or alicyclic hydrocarbon group represented by A$^{11}$ is preferably from 3 to 18, more preferably from 5 to 12, in particular preferably from 5 or 6. A$^{11}$ is preferably a cyclohexane-1,4-diyl group, or 1,4-phenylene group.

The alkanediyl group having 1 to 12 carbon atoms, which is represented by E$^{11}$ is preferably a linear alkanediyl group having 1 to 12 carbon atoms. Any —CH$_2$— that partially constitutes the alkanediyl group having 1 to 12 carbon atoms may be replaced with —O—.

Specific examples of the group include linear alkanediyl groups having 1 to 12 carbon atoms, such as methylene, ethylene, propane-1,3-diyl, butane-1,4-diyl, pentane-1,5-diyl, hexane-1,6-diyl, heptane-1,7-diyl, octane-1,8-diyl, nonane-1,9-diyl, decane-1,10-diyl, undecane-1,11-diyl, and dodecane-1,12-diyl groups; and —CH$_2$—CH$_2$—O—CH$_2$—CH$_2$—, —CH$_2$—CH$_2$—O—CH$_2$—CH$_2$—O—CH$_2$—CH$_2$—, and —CH$_2$—CH$_2$—O—CH$_2$—CH$_2$—O—CH$_2$—CH$_2$—O—CH$_2$—CH$_2$—.

B$^{11}$ is preferably —O—, —S—, —CO—O—, or —O—CO—, more preferably —CO—O—.

B$^{12}$ and B$^{13}$ are each independently preferably —O—, —S—, —C(=O)—, —C(=O)—O—, —O—C(=O)—, or —O—C(=O)—O—, more preferably —O—, or —O—C(=O)—O—.

The polymerizable group represented by P$^{11}$ is preferably a radical polymerizable group or cation polymerizable group since the group is high in photopolymerization reactivity. The polymerizable group is preferably a group represented by any one of the following formulae (P-11) to (P-15) since the group is easy to handle, and the production itself of the polymerizable liquid crystal compound is also easy:

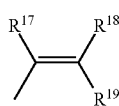
(P-11)

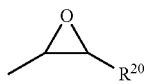
(P-12)

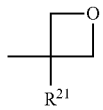
(P-13)

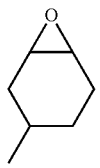
(P-14)

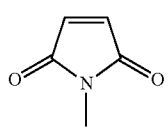
(P-15)

wherein R$^{17}$ to R$^{21}$ each independently represent an alkyl group having 1 to 6 carbon atoms, or a hydrogen atom.

Specific examples of the group represented by any one of the formulae (P-11) to (P-13) include respective groups represented by the following formulae (P-16) to (P-20):

(P-16)

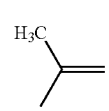
(P-17)

(P-18)

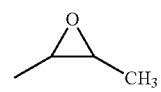
(P-19)

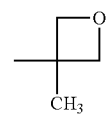
(P-20)

P$^{11}$ is preferably a group represented by any one of the formulae (P-14) to (P-20), more preferably a vinyl, p-stilbene, epoxy or oxetanyl group.

The group represented by P$^{11}$—B$^{11}$— is more preferably an acryloyloxy or methacryloyloxy group.

Examples of the compound (X) include respective compounds represented by the following formulae (I), (II), (III), (IV), (V) and (VI):

P$^{11}$—B$^{11}$-E$^{11}$-B$^{12}$-A$^{11}$-B$^{13}$-A$^{12}$-B$^{14}$-A$^{13}$-B$^{15}$-A$^{14}$-B$^{16}$-E$^{12}$-B$^{17}$—P$^{12}$ (I),

P$^{11}$—B$^{11}$-E$^{11}$-B$^{12}$-A$^{11}$-B$^{13}$-A$^{12}$-B$^{14}$-A$^{13}$-B$^{15}$-A$^{14}$-F$^{11}$ (II),

P$^{11}$—B$^{11}$-E$^{11}$-B$^{12}$-A$^{11}$-B$^{13}$-A$^{12}$-B$^{14}$-A$^{13}$-B$^{15}$-E$^{12}$-B$^{17}$—P$^{12}$ (III),

P$^{11}$—B$^{11}$-E$^{11}$-B$^{12}$-A$^{11}$-B$^{13}$-A$^{12}$-B$^{14}$-A$^{13}$-F$^{11}$ (IV),

P$^{11}$—B$^{11}$-E$^{11}$-B$^{12}$-A$^{11}$-B$^{13}$-A$^{12}$-B$^{14}$-E$^{12}$-B$^{17}$—P$^{12}$ (V), and

P$^{11}$—B$^{11}$-E$^{11}$-B$^{12}$-A$^{11}$-B$^{13}$-A$^{12}$-F$^{11}$ (VI)

wherein A$^{12}$ to A$^{14}$ each independently have the same meaning as A$^{11}$; B$^{14}$ to B$^{16}$ each independently have the same meaning as B$^{12}$; B$^{17}$ has the same meaning as B$^{11}$; E$^{12}$ has the same meaning as E$^{11}$; and F$^{11}$ represents a hydrogen or halogen atom, or an alkyl group having 1 to 13 carbon atoms, an alkoxy group having 1 to 13 carbon atoms, a cyano, nitro, trifluoromethyl, dimethylamino, hydroxyl, methylol, formyl, sulfo (—SO$_3$H) or carboxyl group, or an alkoxycarbonyl group having 1 to 10 carbon atoms provided that any —CH$_2$— that partially constitutes the alkyl or alkoxy group may be replaced with —O—.

Specific examples of the liquid crystal compound (X) include compounds each having a polymerizable group out of compounds described in "3.8.6 Network (Completely Crosslinked Type)" and "6.5.1 Liquid Crystal Material, b. Polymerizable Nematic Liquid Crystal Material" in "Liquid Crystal Handbook" (edited by Liquid Crystal Handbook Editorial Committee, and published by Maruzen Co., Ltd. on Oct. 30, 2000); and polymerizable liquid crystal compounds described in JP-A-2010-31223, 2010-270108, 2011-6360, and 2011-207750.

Specific examples of the compound (X) include respective compounds represented by formulae (I-1) to (I-4), formulae (II-1) to (II-4), formulae (III-1) to (III-26), formulae (IV-1) to (IV-26), formulae (V-1) to (V-2), and formulae (VI-1) to (VI-6) illustrated below. In these formulae, k1s and k2s each independently represent an integer of 2 to 12. These compounds (X) are preferred since the compounds can easily be synthesized or are easily available.

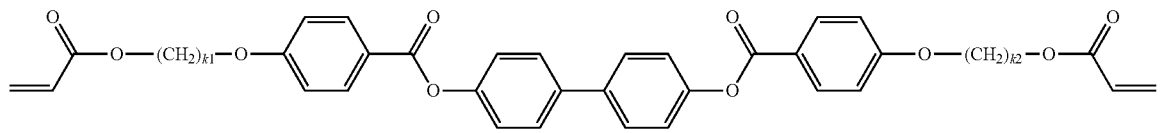
(I-1)

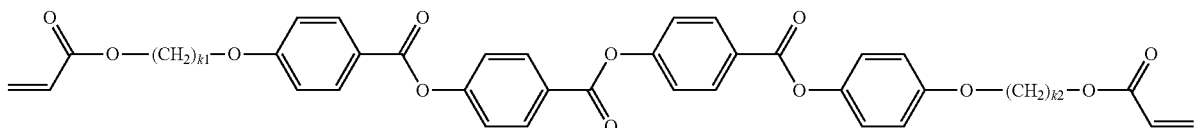
(I-2)

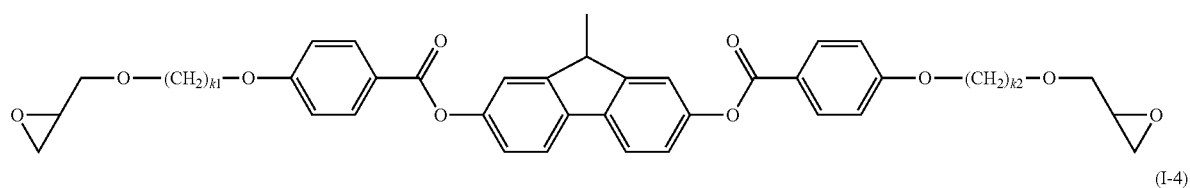
(I-3)

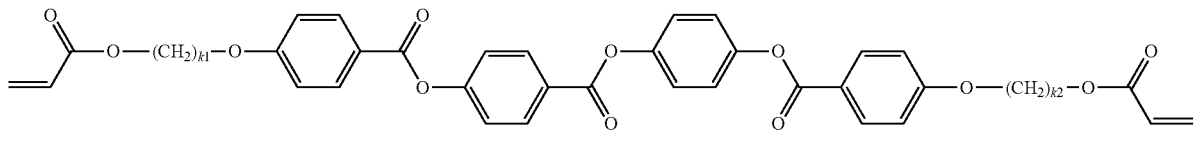
(I-4)

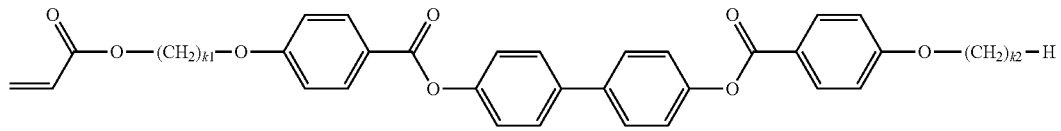
(II-1)

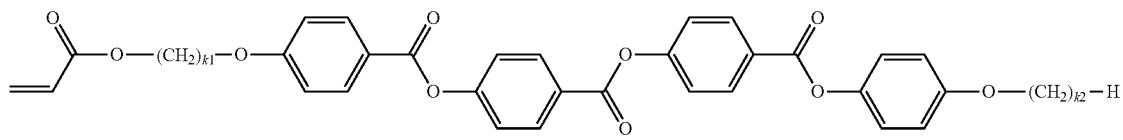
(II-2)

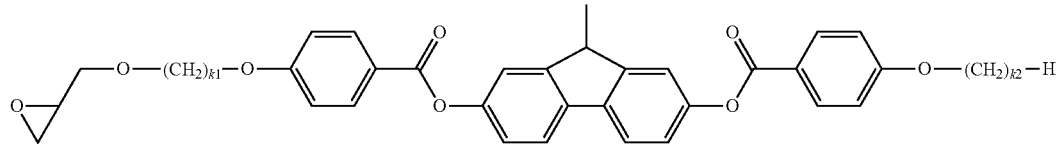
(II-3)

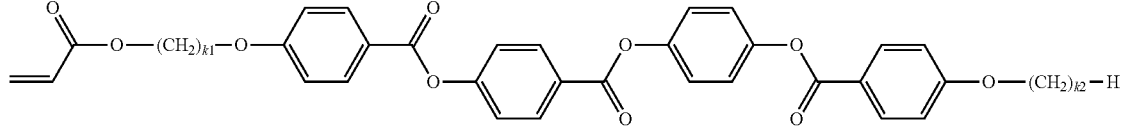
(II-4)

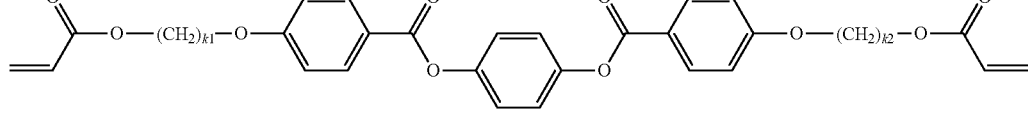
(III-1)

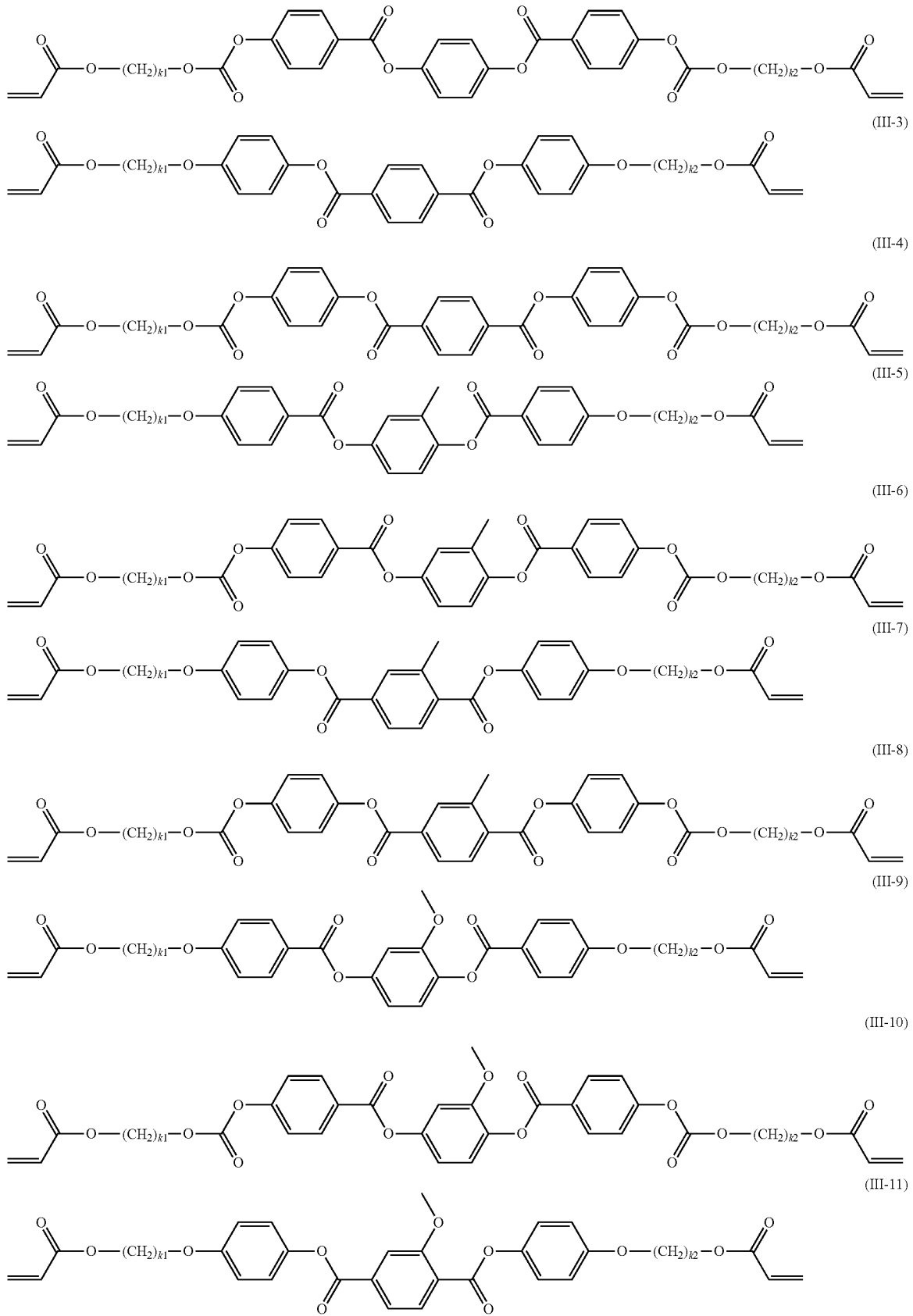

-continued
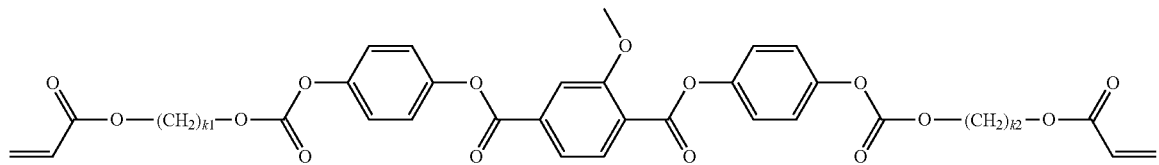
(III-12)
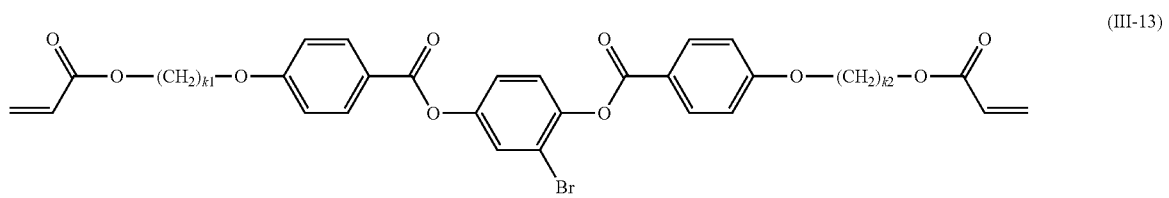
(III-13)
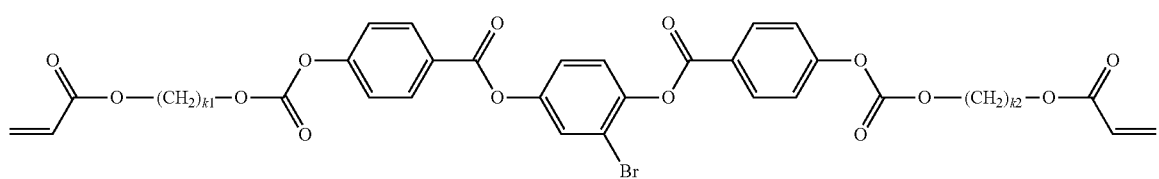
(III-14)
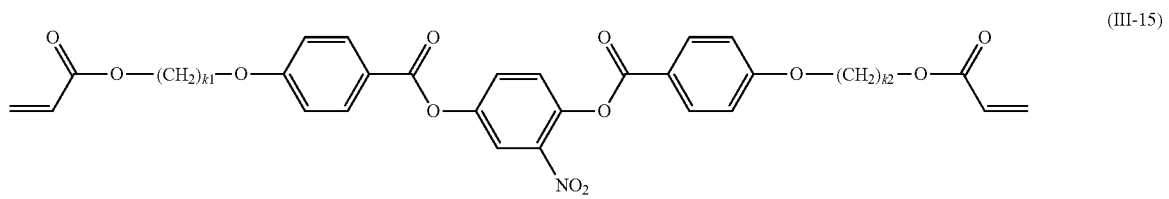
(III-15)
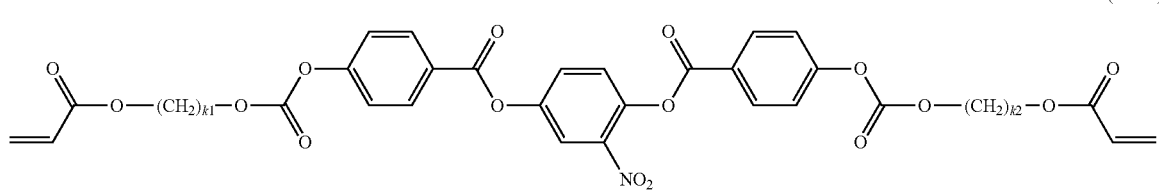
(III-16)
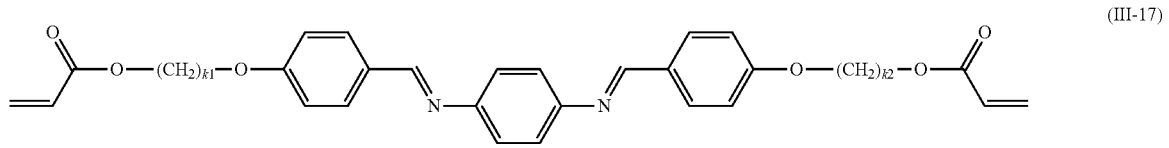
(III-17)
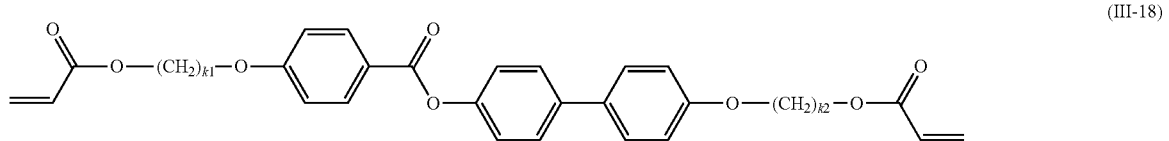
(III-18)
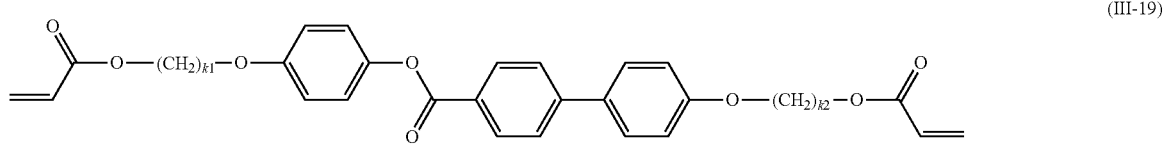
(III-19)
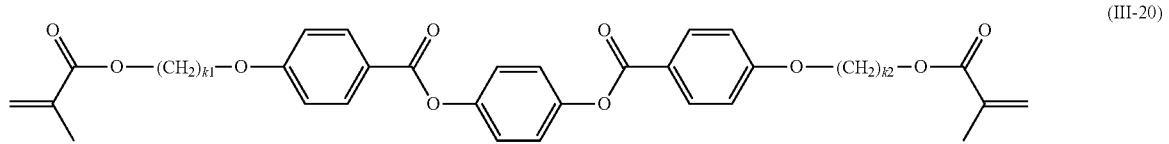
(III-20)

-continued
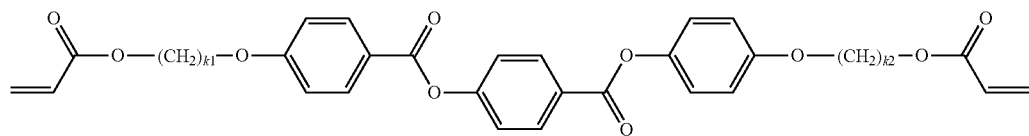
(III-21)
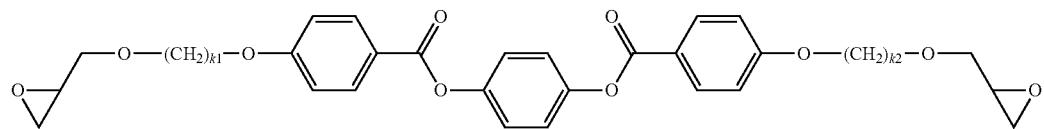
(III-22)
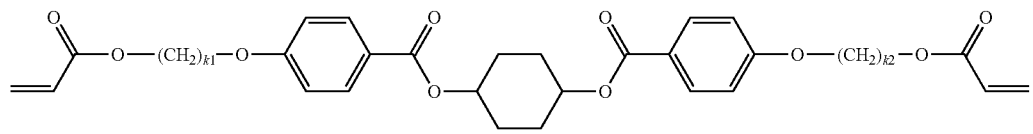
(III-23)
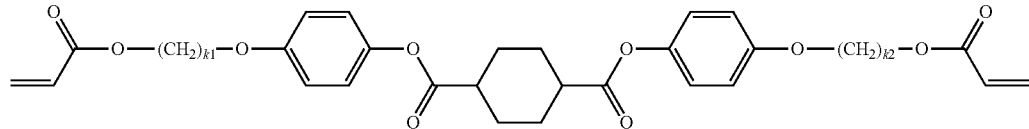
(III-24)
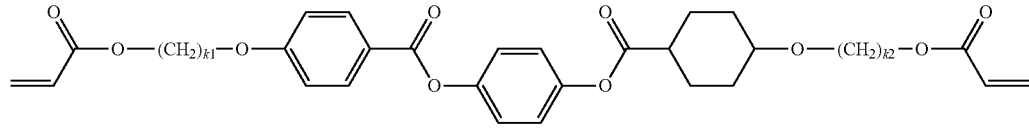
(III-25)
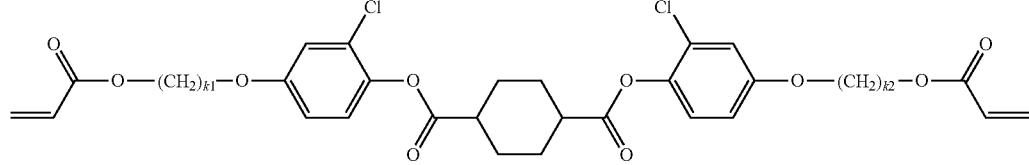
(III-26)
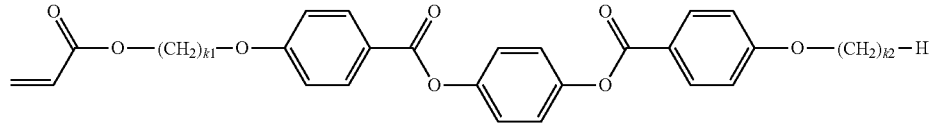
(IV-1)
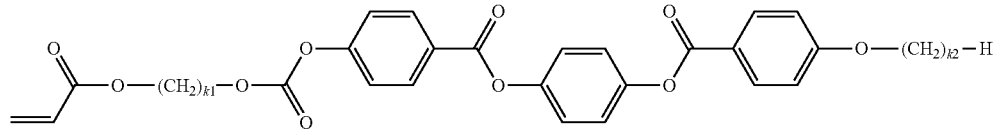
(IV-2)
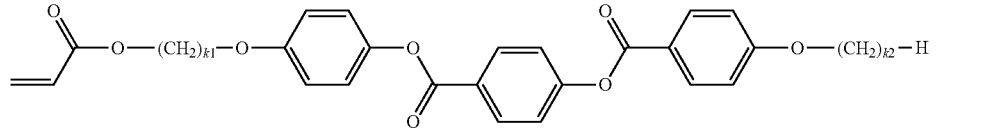
(IV-3)
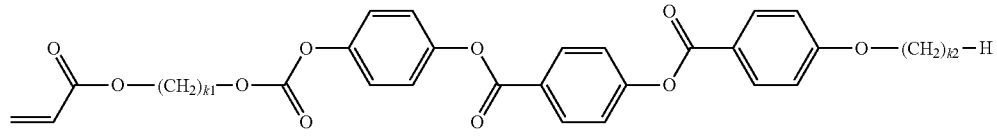
(IV-4)

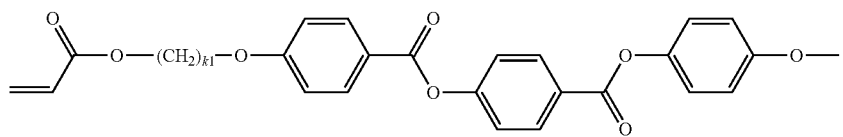
(IV-5)
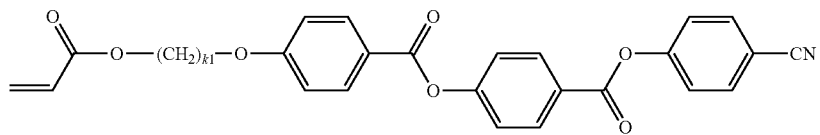
(IV-6)
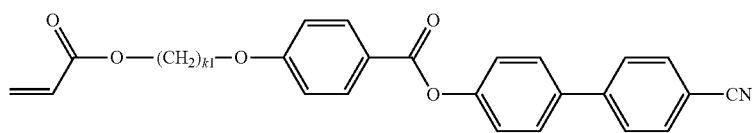
(IV-7)
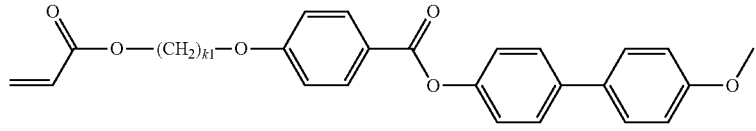
(IV-8)
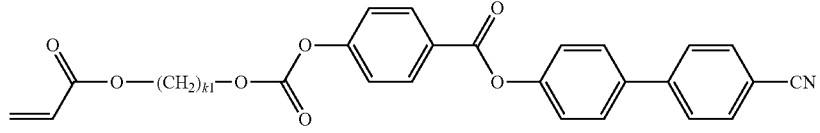
(IV-9)
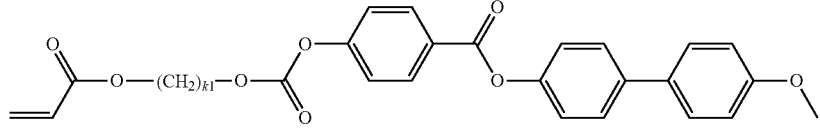
(IV-10)
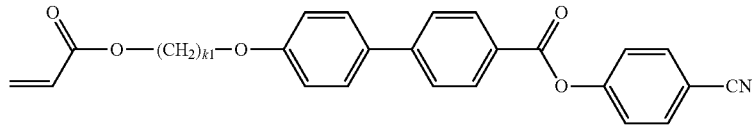
(IV-11)
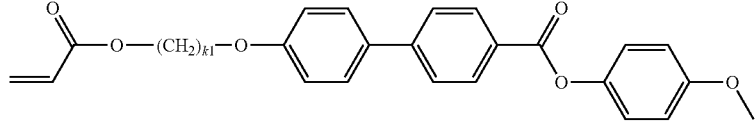
(IV-12)
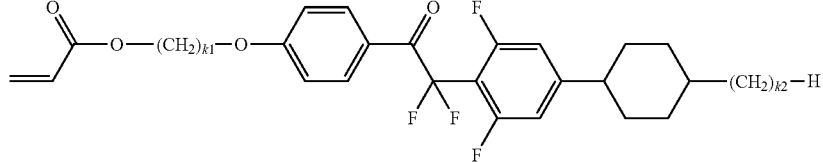
(IV-13)
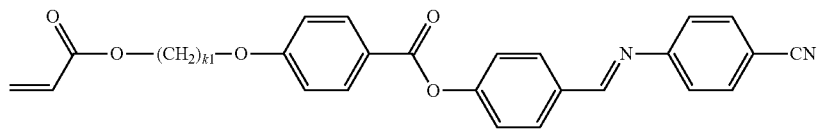
(IV-14)

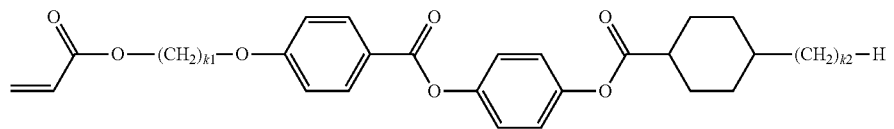
(IV-15)
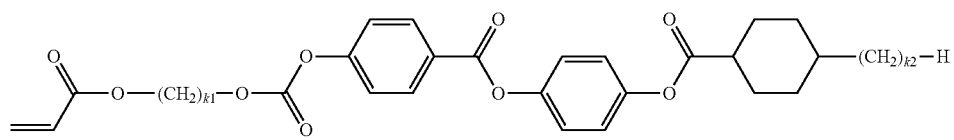
(IV-16)
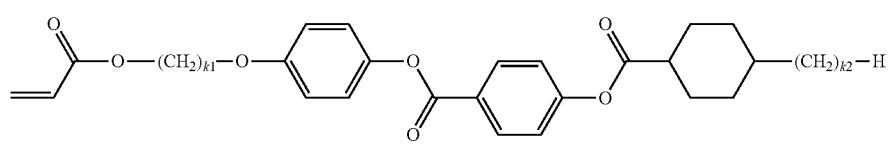
(IV-17)
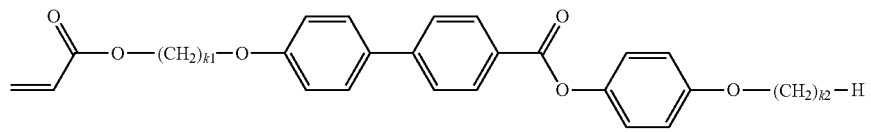
(IV-18)
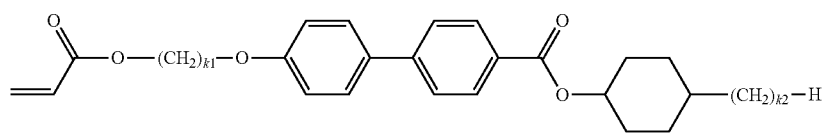
(IV-19)
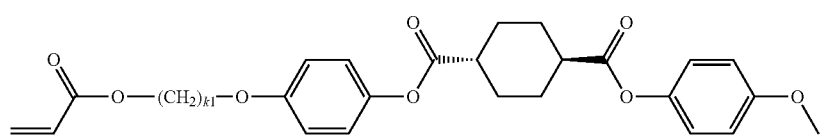
(IV-20)
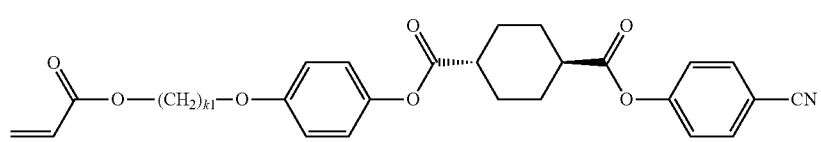
(IV-21)
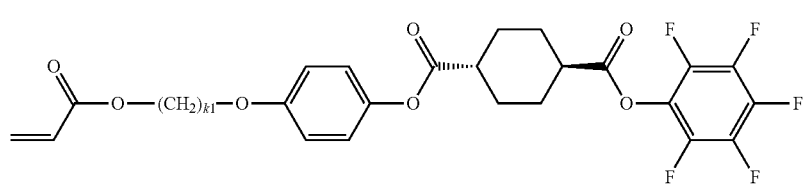
(IV-22)
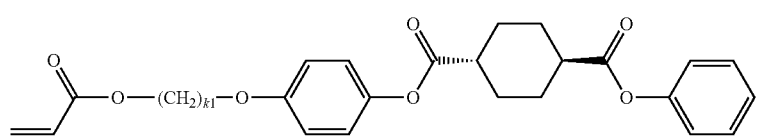
(IV-23)
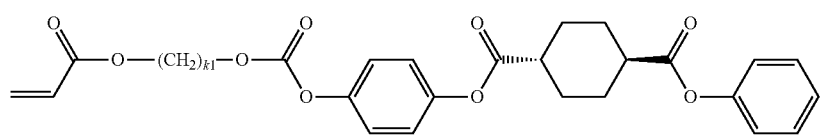
(IV-24)

-continued
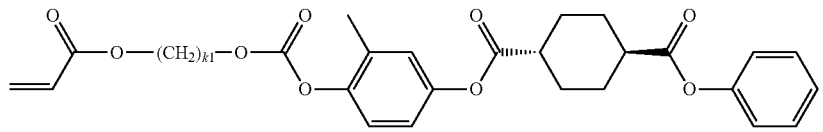
(IV-25)
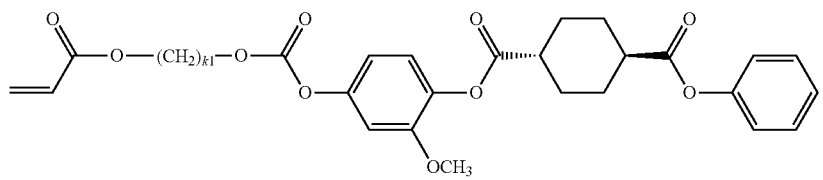
(IV-26)
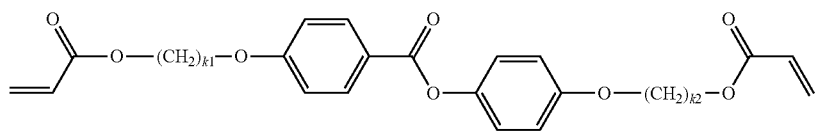
(V-1)
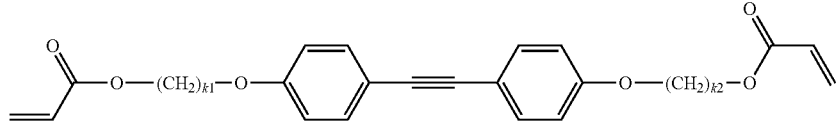
(V-2)
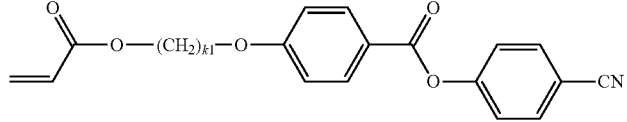
(VI-1)
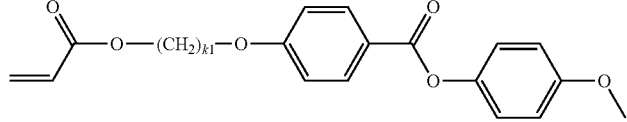
(VI-2)
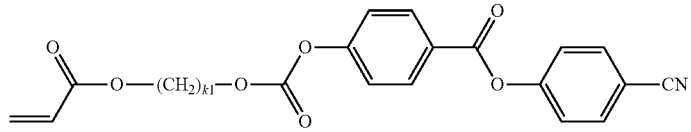
(VI-3)
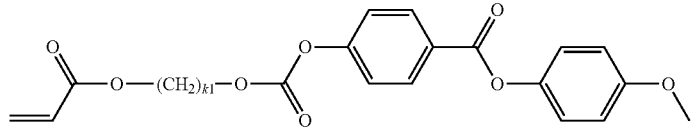
(VI-4)
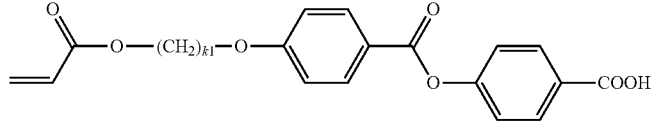
(VI-5)
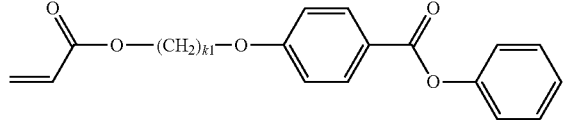
(VI-6)

By adjusting the ratio between the blend amounts of the compounds (X) and (A), the wavelength dispersion characteristic of the laminated body of the present invention can be controlled. The content of the compound (X; in the optically-anisotropic-layer-forming composition is usually from 5 to 50 parts by mass, preferably from 5 to 10 parts by mass for 100 parts by mass of this composition.

The content of the compound (X) in the optically-anisotropic-layer-forming composition is usually from 0 to 50 parts by mass, preferably from 0 to 10 parts by mass for 100 parts by mass of the compound (A).

In order to orient the polymerizable liquid crystal compound contained in the optically anisotropic layer, it is advisable to apply the optically-anisotropic-layer-forming composition onto a substrate. However, an oriented film layer may be used. In other words, the laminated body of the present invention may have, between its substrate and optically anisotropic layer, an oriented film layer.

The oriented film layer in the present invention is preferably a layer that is insoluble in the optically-anisotropic-layer-forming composition, is not deteriorated by heating for removing the solvent contained in this composition or for adjusting the liquid crystal orientation of the polymerizable liquid crystal compound, and that is not easily peeled by friction when the laminated body is transported, and by other causes.

The method for producing the oriented film layer may be generally a method of applying an orienting polymer to a surface of the substrate, and drying the resultant; a method of applying an orienting polymer to the surface, drying the resultant, and rubbing the outer surface of the applied polymer; a method of applying an optically orienting polymer to the surface, drying the resultant, and radiating polarized light onto the dried product; a method of vapor-depositing silicon oxide obliquely on the surface; and a method of using the Langmuir-Blodgett method (LB method) to form, onto the surface, a monomolecular membrane having a long chain alkyl group.

The orienting polymer and the optically orienting polymer are each usually applied in the state of being dissolved in a solvent.

Examples of the orienting polymer include polyamides and gelatins, which each have in the molecule thereof amide bonds, polyimides, which each have in the molecule thereof imide bonds, polyamic acids, which are each a hydrolyzate of a polyimide, polyvinyl alcohol, alkyl-modified polyvinyl alcohol, polyacrylamide, polyoxazol, polyethyleneimine, polystyrene, polyvinylpyrrolidone, polyacrylic acid, and polyacrylate. Of these examples, preferred is at least one selected from the group consisting of polyamides, polyimides, and polyamic acids. Such optically orienting polymers, which can form the oriented film layer, may be used alone, or in the form of a combination of two or more different-structure-polymers or a copolymer having two or more different-structure-polymers out of the optically orienting polymers. These orienting polymers can each easily be obtained by subjecting a monomer thereof to a polycondensation based on dehydration, dealcoholization or some other, a chain polymerization such as radical polymerization, anion polymerization or cation polymerization, coordination polymerization, ring-opening polymerization, or some other polymerization.

Examples of a commercially available product of the orienting polymer include products Sunever ((registered trademark) manufactured by Nissan Chemical Industries, Ltd.), and Optomer ((registered trade) manufactured by JSR Corp.).

An oriented film layer formed from such an orienting polymer makes the liquid crystal orientation of a polymerizable liquid crystal compound easy. In accordance with the kind of the orienting polymer or rubbing conditions, the orientation of the liquid crystal can be controlled into various orientations such as horizontal orientation, vertical orientation, hybrid orientation and oblique orientation. The oriented film layer is usable for an improvement in the visual field angle of various liquid crystal panels.

The optically orienting polymer may be a polymer having a photosensitive structure. When polarized light is radiated onto the polymer having a photosensitive structure, the photosensitive structure in the light-radiated region is isomerized or crosslinked so that the optically orienting polymer is oriented. As a result, orientation regulating force is given to a film made of the optically oriented polymer. Examples of the photosensitive structure include azobenzene, maleimide, chalcone, cinnamic acid, 1,2-vinylene, 1,2-acetylene, spiropyran, spirobenzopyran, and fulgide structures. Such optically orienting polymers, which can form the oriented film layer, may be used alone or in any combination of two or more different-structure-polymers out of these optically orienting polymers; or such an orienting polymer may be in the form of a copolymer having different photosensitive structures. The optically orienting polymer can be obtained by subjecting a monomer having a photosensitive structure to polycondensation based on dehydration, dealcoholization or some other, a chain polymerization such as radical polymerization, anion polymerization or cation polymerization, coordination polymerization, ring-opening polymerization or some other polymerization. Examples of the optically orienting polymer include optically orienting polymers described in Japanese Patent Nos. 4450261, 4011652 and 4404090, and JP-A-2010-49230, 2007-156439 and 2007-232934. Of these examples, preferred are polymers that can each form a crosslinked structure by irradiation with polarized light from the viewpoint of the endurance thereof.

In the present invention, the method for forming the oriented film layer is preferably the method of applying an orienting polymer made of one or more selected from polyimides, polyamides and polyamic acids, and then drying the workpiece, or the method of applying an orienting polymer, drying the workpiece, and then rubbing the outer surface of the resultant.

Examples of the solvent in which the orienting polymer or optically orienting polymer is dissolved include water; alcohol solvents such as methanol, ethanol, ethylene glycol, isopropyl alcohol, propylene glycol, methylcellosolve, and butylcellosolve; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, methyl isobutyl ketone, and N-methyl-2-pyrrolidone; aliphatic hydrocarbon solvents such as pentane, hexane, heptane and ethylcyclohexane; aromatic hydrocarbon solvents such as toluene, xylene and chlorobenzene; nitrile solvents such as acetonitrile; ether solvents such as propylene glycol monomethyl ether, tetrahydrofuran, and dimethoxyethane; and halogenated hydrocarbon solvents such as chloroform. These solvents may be used alone or in combination.

The amount of the solvent is usually from 10 to 100000 parts by mass, preferably from 1000 to 50000 parts by mass, more preferably from 2000 to 20000 parts by mass for 100 parts by mass of the orienting polymer or optically orienting polymer.

Examples of the method for applying the orienting polymer or optically orienting polymer dissolved in the solvent to the substrate include extrusion coating, direct gravure coating, reverse gravure coating, CAP coating, and die coating; and a method of attaining the application, using a coater such as a dip coater, a bar coater, or a spin coater.

Examples of the method for the drying include natural drying, ventilation drying, heat drying, and reduced-pressure drying; and any combination of two or more of these methods. The drying temperature is preferably from 10 to 250° C., more preferably from 25 to 200° C. The drying period, which depends on the hind of the solvent, is preferably from 5 seconds to 60 minutes, more preferably from 10 seconds to 30 minutes.

The method for the rubbing may be a method of bringing a rubbing-cloth-wound rubbing roll that is being rotated into contact with the orienting polymer applied to the substrate and then dried.

The method for radiating the polarized light is, for example, a method by use of a device described in JP-A-2006-323060. A patterned oriented film layer can be formed by radiating polarized light, such as linearly polarized ultraviolet rays, onto a desired region (composed of plural sections) through a photomask corresponding to the desired region, and repeating this operation also for each of other desired regions. The photomask may be a member in which a light-shielding pattern is located onto a piece or film made of quartz glass, sodium lime glass, polyester or some other material. The region covered with the light-shielding pattern shuts out the radiated polarized light while the region uncovered therewith transmits the polarized light. The quartz glass piece is preferred since the effect of thermal expansion to the piece is small. The radiated polarized light is preferably ultraviolet rays from the viewpoint of the reactivity of the optically orienting polymer with the rays.

The thickness of the oriented film layer is usually from 10 to 10000 nm, preferably from 10 to 1000 nm.

When the thickness of the oriented film layer is in the range, the polymerizable liquid crystal compound thereon can be favorably liquid-crystal-oriented with ease into a desired direction or angle.

Examples of the state of the liquid crystal orientation of the polymerizable liquid crystal compound include horizontal orientation, vertical orientation, hybrid orientation, and oblique orientation. The state is preferably vertical orientation. The expression "horizontal" and "vertical", and expressions related thereto each represent the orientation direction of a long axis of the polymerizable liquid crystal compound, the reference of this direction being the plane of the substrate. For example, the expression "vertical orientation" denotes that the polymerizable liquid crystal compound has a long axis along a direction vertical to the substrate plane.

The state of the liquid crystal orientation is varied in accordance with respective properties of the oriented film layer and the polymerizable liquid crystal compound. The combination of the two is selectable at will. When the oriented film layer is made of, for example, a material expressing, as its orientation regulating force, horizontal orientation regulating force, the polymerizable liquid crystal compound can attain horizontal orientation or hybrid orientation. When the oriented film layer is made of a material expressing vertical orientation regulating force, the polymerizable liquid crystal compound can attain vertical orientation or oblique orientation.

When the oriented film layer is made of an orienting polymer, the orientation regulating force is adjustable at will in accordance with the outer surface state or rubbing conditions. When the oriented film layer is made of an optically orienting polymer, the force is adjustable at will in accordance with polarized-light-radiating conditions and others. The liquid crystal orientation is also controllable by selecting the surface tension, the liquid crystal property or some other property of the polymerizable liquid crystal compound.

In the present invention, the oriented film layer is preferably a layer having an orientation regulating force capable of orienting any polymerizable liquid crystal compound vertically. Specifically, its orienting polymer has therein a nonpolar substituent containing or made of one or more sulfur atoms, fluorine atoms and/or others. For example, the following is usable: a material used generally for a liquid crystal oriented film of a vertical orientation type liquid crystal display device, this material being a material as described in Japanese Patent No. 4605016, 4985906 or 4502119, or WO 2008/117760.

When the polymerizable liquid crystal compound contained in the applied optically-anisotropic-layer-forming composition exhibits a liquid crystal phase such as a nematic phase, the resultant optically anisotropic layer has a birefringence property based on mono-domain orientation. In order to form the optically anisotropic layer, the optically-anisotropic-layer-forming composition is applied onto a substrate or oriented film layer as described above, and then the resultant is irradiated with light to cure the polymerizable liquid crystal compound.

Examples of the method for applying the optically-anisotropic-layer-forming composition onto the substrate or oriented film layer include extrusion coating, direct gravure coating, reverse gravure coating, CAP coating, slit coating, and die coating methods; and a method of attaining the application, using a coater such as a dip coater, a bar coater, or a spin coater. Preferred are CAP coating, inkjet coating, dip coating, slit coating, die coating, and bar-coater-used coating methods since these methods make it possible to attain the application continuously in a roll-to-roll manner. When this composition is applied in a roll-to-roll manner. It is possible to apply the orienting-polymer-containing composition onto the substrate to form an oriented film layer, and continuously form an optically anisotropic film onto the resultant oriented film layer.

The irradiation with light is attained usually by visible rays, ultraviolet rays, or a laser ray, preferably by ultraviolet rays.

The applied optically-anisotropic-layer-forming composition may receive, as it is, irradiation with light. When the optically-anisotropic-layer-forming composition contains a solvent, the composition preferably receives the irradiation with light after the composition is dried to remove the solvent. By the removal of the solvent from the applied optically-anisotropic-layer-forming composition, the polymerizable liquid crystal compound contained in this composition produces liquid crystal orientation. The drying (for the removal of the solvent) may be performed simultaneously with the irradiation with light. Preferably, before the irradiation with light is performed, almost all of the solvent should be removed. Examples of the method for the drying include the same methods as used for the drying when the oriented film layer is formed. Of these examples, preferred are natural drying and heat drying. The drying temperature is preferably from 0 to 250° C., more preferably from 50 to 220° C., even more preferably from 60 to 170° C. The drying period is preferably from 10 seconds to 60 minutes, more preferably from 30 seconds to 30 minutes.

When the laminated body of the present invention is set between polarizing plates having absorption axes orthogonal to each other, light leakage therefrom is very small. Specifically, in the case of adopting a structure in which a polarizing plate (A), the present laminated body and a polarizing plate (B) are stacked onto each other in this order, making the absorption axis of the polarizing plate (A) orthogonal to that of the polarizing plate (B), and further adopting any one of the following cases (a) and (b):

(a) in a case where the substrate, which partially constitutes the laminated body, has a slow axis inside the plane thereof, this substrate is arranged at the polarizing plate (B) side of the structure and further the substrate is laminated to make the slow ax is of the substrate parallel with the absorption axis of the polarizing plate (B), and (b) in a case where the substrate, which partially constitutes the laminated body, has no slow axis inside the plane thereof, this substrate is arranged at the polarizing plate (B) side of the structure, the transmittance at wavelengths of 550 nm T of the structure, this transmittance being obtained when light is radiated into the structure from the polarizing plate (B) side thereof and then the resultant transmitted light is detected from the polarizing plate (A) side thereof, satisfies the following expression (D):

$$0.000 < T < 0.005 \tag{D}$$

wherein the transmittance T is a value relative to the transmittance of a stacked body of the polarizing plates (A) and (B) that is obtained when the polarizing plates (A) and (B) are arranged to make the respective axes thereof parallel with each other, this transmittance being regarded as 100%.

In the case (a), where the substrate has its slow axis inside the plane thereof, a retardation in the substrate is unfavorably generated when the absorption axes of the polarizing plates are not parallel with the slow axis of the substrate. Thus, light, leakage is generated according to only the substrate. In other words, when the property of the laminated body is verified, the stacking as described in the item (a) needs to be performed.

In the case (b), where the substrate has no slow axis inside the plane thereof, no retardation is generated even when the substrate is set between the polarizing plates to have any configuration. Thus, the property of the laminated body can be verified.

The transmittance T at wavelengths of 550 nm represented by the expression (D) is measurable with an ordinary ultraviolet-visible spectrometer. The transmittance of the stacked body of the polarizing plates (A) and (B) is supposed or regarded as 100% when the polarizing plates (A) and (B) are arranged to make the absorption axes thereof parallel with each other; under this supposition, the transmittance of the laminated body of the invention is measured in the state of being interposed between the polarizing plates (A) and (B) to make their absorption axes orthogonal to each other. This measurement makes it possible to verify the degree of light leakage from the laminated body.

The laminated body obtained by the present invention is excellent in orientation, so that the body can be largely restrained from undergoing light leakage based on a disorder of the liquid crystal orientation. Thus, when the laminated body is integrated into a display device, properties thereof are also excellent.

The substrate in the present invention preferably satisfies the following expression (4):

$$n_x > n_y \cong n_z \tag{4}$$

$n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$.

Examples of the substrate satisfying the expression (4) include commercially available substrates, Arton film (manufactured by JSR Corp), Zeonor film (manufactured by Optes Ltd), S Sheena (manufactured by Sekisui Chemical Co., Ltd.), VA-TAC (manufactured by Konica Minolta Opto Products Co., Ltd.), and Sumicalight (Sumitomo Chemical Co., Ltd.).

When the substrate satisfies the relationship or $n_x > n_y \cong n_z$, the substrate shows an optical property generally called negative B plate. When the substrate satisfies the relationship of $n_x > n_y = n_z$, the substrate shows an optical property generally called positive A plate. The use of any one of these substrates makes it possible to improve the compensation effect of the laminated body. It is preferred from the viewpoint of the easiness of the production of the substrate to use the relationship of $n_x > n_y \cong n_z$.

Furthermore, the substrate in the present invention preferably satisfies the following expressions (5) and (6), or expressions (7) and (8):

$$\Delta n(450)/\Delta n(550) \geq 1.00 \tag{5 and}$$

$$1.00 \geq \Delta n(650)/\Delta n(550) \tag{6, or}$$

$$\Delta n(450)/\Delta n(550) \leq 1.00 \tag{7 and}$$

$$1.00 \leq \Delta n(650)/\Delta n(550) \tag{8}$$

wherein $\Delta n(450)$, $\Delta n(550)$ and $\Delta n(650)$ represent the respective birefringences of the substrate that are derived from the front retardation values of the laminated body that are obtained by measuring the laminated body at wavelengths of 450 nm, 550 nm, and 650 nm.

Examples of the substrate satisfying the expressions (5) and (6) include the commercially available films described individually as the substrate satisfying the expression (4).

An example of the substrate satisfying the expressions (7) and (8) is a commercially available substrate, for example, Pure-Ace (registered trademark) WR manufactured by Teijin Ltd.

The matter that the substrate satisfies the expressions (5) and (5) denotes that the substrate shows a smaller birefringence as the substrate receives light having a longer wavelength, which demonstrates that the wavelength dispersion characteristic of the substrate is a positive wavelength dispersion.

The matter that the substrate satisfies the expressions (7) and (8) denotes that the substrate shows a larger birefringence as the substrate receives light having a longer wavelength, which demonstrates that the wavelength dispersion characteristic of the substrate is a reverse wavelength dispersion.

The present laminated body may be produced by a production method including the following steps (a1) and (a2):

step (a1) of applying a composition including a polymerizable liquid crystal compound represented by the formula (A) to a substrate; and step (a2) of drying the applied composition, and radiating light to the composition to cure the composition.

The present laminated body may also be produced by a production method including the following steps (b1), (b2) and (b3):

step (b1) of applying an orienting polymer to a substrate to form an oriented film layer;

step (b2) of applying a composition including a polymerizable liquid crystal compound represented by the formula (A) onto the oriented film layer; and step (b3) of drying the applied composition, and radiating light to the composition to cure the composition.

The thickness of the optically anisotropic layer may be appropriately adjusted in accordance with the usage thereof. The thickness is preferably from 0.1 to 10 μm. In order to make this layer small in photoelasticity, the thickness is more preferably from 0.2 to 5 μm.

Out of species of the present laminated body, a species in which its polymerizable liquid crystal compound is vertically oriented is useful as a retardation film used for converting, into circularly polarized light or elliptically polarized light, polarized light considered to be linearly polarized light when the laminated body is checked from any oblique angle at the light-radiating-out side of the body; for converting polarized light considered to be circularly or elliptically polarized light into linearly polarized light; or for changing the polarization direction of linearly polarized light.

The retardation film is excellent in transparency in the visible ray range to be usable as a member for various display devices.

Laminated bodies of the present invention may be laminated onto each other, or the present laminated body may be combined with a different film. In the case of laminating laminated bodies of the invention in which the respective orientation states of their polymerizable liquid crystal compounds are different from each other, or combining the present laminated body with a different film, the resultant is usable as a viewing angle compensating film, a viewing angle enlarging film, an antireflective film, a polarizing plate, a circularly polarizing plate, an elliptically polarizing plate, or a brightness enhancement film.

The present laminated body can be changed in optical property in accordance with the orientation state of the polymerizable liquid crystal compound. The laminated body is usable as a retardation plate for a liquid crystal display device that may be in various modes such as a vertical alignment (VA) mode, an in-plane switching (IPS) mode, an optically compensated bend (OCB) mode, a twisted nematic (TN) mode, and a super twisted nematic (STN) mode.

When the present laminated body is used as a positive C plate, it is advisable to adjust the front retardation value Re(550) usually into the range of 0 to 10 nm, preferably of 0 to 5 nm, and it is advisable to adjust the thickness direction retardation value $R_{th}$ usually into the range of −10 to −300 nm, preferably of −20 to −200 nm. It is preferred to select the front retardation value Re(550) appropriately in accordance with properties of a liquid crystal cell in which this laminated body is used. The positive C plate is particularly suitable for compensating an IPS mode liquid crystal display device.

The thickness direction retardation value $R_{th}$, which means the refractive index anisotropy in the thickness direction of the laminated body, can be calculated, using the retardation value $R_{50}$ measured in the state of inclining the in-plane fast axis at 50 degree to act as an inclined axis, and the in-plane retardation value $R_0$. Specifically, the thickness direction retardation value $R_{th}$ can be calculated by using the following values: the in-plane retardation value $R_0$, the retardation value $R_{50}$, which is measured in the state of inclining the fast axis at 50 degrees to act as an inclined axis, the optically anisotropic layer thickness d, and the average refractive index $n_0$ of the optically anisotropic layer, so as to calculate the refractive indexes $n_x$, $n_y$ and $n_z$ in accordance with equations (9) to (11) described below; and then substituting these refractive indexes for an equation (8) described below.

$$R_{th}=[(n_x+n_y)/2-n_z]\times d \qquad (8),$$

$$R_0=(n_x-n_y)\times d \qquad (9),$$

$$R_{50}=(n_x-n_y')\times d/\cos(\phi) \qquad (10), \text{ and}$$

$$(n_x+n_y+n_z)/3=n_0 \qquad (11)$$

wherein $\phi=\sin^{-1}[\sin(50°)/n_0]$, and
$n_y'=n_y\times n_z/[n_y^2\times\sin^2(\phi)+n_z^2\times\cos^2(\phi)]^{1/2}$.

By transferring the optically anisotropic layer of the laminated body of the present invention onto a transfer-receiving substrate to interpose an adhesive between the optically anisotropic layer and the transfer-receiving substrate, a second laminated body can be obtained which includes the transfer-receiving substrate, a layer of the adhesive, and the optically anisotropic layer.

The adhesive may be a known adhesive, and the transferring may be performed by a known method. The transfer-receiving substrate may be the same as used as the above-mentioned substrate or polarizing plate.

The second laminated body according to the present invention has the same optical properties as the laminated body of the invention.

When the laminated body of the present invention has a substrate, an oriented film layer and an optically anisotropic layer, the optically anisotropic layer and the oriented film layer of the laminated body of the invention are transferred onto a transfer-receiving substrate to interpose an adhesive between the two transferred layers and the transfer-receiving substrate, thereby making it possible to yield a second laminated body composed of the transfer-receiving substrate, a layer of the adhesive, the optically anisotropic layer, and the oriented film layer.

FIGS. 1A and 1B schematically illustrate examples of the present laminated body, respectively. FIG. 1A illustrates a laminated body 100 in which an optically anisotropic layer 2 is laminated on a substrate 1. FIG. 1B illustrates another laminated body 100 in which over a substrate 1, an oriented film layer 3 and an optically anisotropic layer 2 are laminated in this order.

The present laminated body is also useful as a member that partially constitutes a polarizing plate. The polarizing plate of the present invention includes the present laminated body and a polarization film. The present laminated body is included usually as a retardation film.

Specific examples of the polarizing plate of the invention include polarizing plates illustrated in FIGS. 2A to 2D. A polarizing plate 110 illustrated in FIG. 2A is a polarizing plate in which a polarization film 4, an optically anisotropic layer 2 and a substrate 1 are arranged or stacked in this order. A polarizing plate 110 illustrated in FIG. 2B is a polarizing plate in which a polarization film 4, a substrate 1, and an optically anisotropic layer 2 are arranged or stacked in this order. A polarizing plate 110 illustrated in FIG. 2C is a polarizing plate in which a polarization film 4, an optically anisotropic layer 2, an oriented film layer 3 and a substrate 1 are arranged or stacked in this order. A polarizing plate 110 illustrated in FIG. 2D is a polarizing plate in which a polarization film 4, a substrate 1, an oriented film layer 3 and an optically anisotropic layer 2 are arranged or stacked in this order. Any one of the polarization films 4 may be joined to the corresponding optically anisotropic layer 2 or substrate 1 through an adhesive and/or binder.

It is sufficient for each of the polarization films 4 to be a film having a polarizing function. Examples thereof include a film obtained by causing iodine or a dichroic dye to be absorbed into a polyvinyl alcohol based film, and then drawing the resultant film, or a film obtained by drawing a polyvinyl alcohol based film, and then causing iodine or a dichroic dye to be absorbed into the drawn film.

The polarization film 4 may be protected with a protective film if necessary. Examples of the protective film include polyolefin films, examples of the polyolefin including polyethylene, polypropylene and norbornene polymers; and polyethylene terephthalate, polymethacrylate, polyacrylate, cellulose ester, polyethylene naphthalate, polycarbonate, polysulfone, polyethersulfone, polyetherketone, polyphenylenesulfide, and polyphenyleneoxide films.

The adhesive is preferably an adhesive high in transparency and excellent in heat resistance. Examples of the adhesive include acrylic based, epoxy based and urethane based adhesives.

The present laminated body is usable for various display devices. The display devices are each a device having a display element, and may contain, as a light emitting source, a light emitting element or a light emitting unit. Examples of the display devices include liquid crystal display devices, organic electroluminescence (EL) display devices, inorganic EL display devices, touch panel display devices, electron emission display devices (such as field emission display devices (FEDs) and surface field emission display devices (SEDs)), display devices using an electronic paper (electronic ink) or an electrophoresis element, plasma display devices, projection type display devices (such as grating light valve (GLV) display devices, and display devices having a digital micro-mirror device (DMD)), and piezoelectric ceramic displays. The liquid crystal display devices include transmissive liquid crystal display devices, transflective liquid crystal display devices, reflective liquid crystal display devices, direct viewing type liquid crystal display devices, and projection type liquid crystal display devices. These display devices may be display devices for displaying two-dimensional images, or three-dimensional display devices for displaying three-dimensional images. The present laminated body is particularly useful for liquid crystal display devices, touch panel display devices, organic EL display devices and inorganic EL display devices in light of a relationship between these display devices and the axis of their optically anisotropic layer to be stacked.

FIGS. 3A to 3D are each a schematic view of a liquid crystal display device having the present laminated body.

The liquid crystal display devices illustrated in FIGS. 3A to 3D, respectively, each have a structure in which a polarizing plate 110 of the present invention is bonded to one of the main surfaces of a liquid crystal panel 5 through an adhesive and/or a binder while a polarization film 4', to the other surface of the liquid crystal panel 5 through the same. The absorption axis of the polarization film 4 is orthogonal to that of a polarization film 4' of the polarizing plate 110.

The present laminated body is excellent in light-leakage-restraining effect when an in-plane switching (IPS) mode display device using this body shows black display. A description is made herein about the relationship between the slow axis of the substrate 1 and the absorption axis of the polarization film 4 (in each of FIG. 3) when the present laminated body is used for compensation of an IPS mode display device. In a case where the structure illustrated in each of FIGS. 3A and 3C the absorption axis of the polarization film 4 is parallel with the slow axis of the substrate 1 while in the structure illustrated in each of FIGS. 3B and 3D the absorption axis of the polarization film 4 is orthogonal to the slow axis of the substrate 1, the state of the polarized light radiated out from the liquid crystal panel can be satisfactorily converted by the anisotropy of the substrate and that of the optically anisotropic layer when the panel is viewed from an oblique direction. In the liquid crystal display device illustrated in each of FIGS. 3A to 3D, electrodes not illustrated are used to apply a voltage to the liquid crystal panel, thereby changing the liquid crystal orientation of molecules of the liquid crystal so that monochrome display can be realized.

FIGS. 4A to 4D are each a schematic view of an organic EL display device having the present laminated body.

FIG. 4A illustrates an organic EL display device in which a polarization film 4, an optically anisotropic layer 2, a substrate 1 and an organic EL panel 6 are arranged or stacked in this order. FIG. 4B illustrates an organic EL display device in which a polarization film 4, a substrate 1, an optically anisotropic layer 2 and an organic EL panel 6 are arranged or stacked in this order. FIG. 4C illustrates an organic EL display device in which a polarization film 4, an optically anisotropic layer 2, an oriented film layer 3, a substrate 1 and an organic EL panel 6 are arranged or stacked in this order. FIG. 4D illustrates an organic EL display device in which a polarization film 4, a substrate 1, an oriented film layer 3, an optically anisotropic layer 2, and an organic EL panel 6 are arranged or stacked in this order. When the polarization film 4 and the substrate 1 are stacked onto each other to set the angle made between the absorption axis of the former and the slow axis of the latter to 45° in any one of these illustrated cases, the present laminated body expresses a function as a circularly polarizing plate to be usable as an antireflective layer excellent for an organic EL display device.

EXAMPLES

Hereinafter, the present invention will be more specifically described by way of working examples thereof. The symbol and the word "part(s)" described in these examples denote "% by mass" and "part(s) by mass", respectively, unless otherwise specified.

[Preparation of an Orienting Polymer Composition]

To a commercially available orienting polymer, Sunever SE-610 manufactured by Nissan Chemical Industries, Ltd.), were added N-methyl-2-pyrrolidone, 2-butoxyethanol, and ethylcyclohexane to prepare an orienting polymer composition (A). The composition of the orienting polymer composition is shown in Table 1.

TABLE 1

|  | SE-610 (solid content) | N-methyl-2-pyrrolidone | 2-Butoxyethanol | Ethylcyclohexane |
| --- | --- | --- | --- | --- |
| Orienting polymer composition | 0.26 g (0.5%) | 36.8 g (72.3%) | 9.2 g (18.1%) | 4.6 g (9.1%) |

In Table 1, a value in each pair of parentheses represents the content by percentage of the corresponding component in the total of the prepared composition. About the polymer SE-610, the solid content by percentage in the polymer was obtained by conversion from a delivered specification thereof.

Example 1

Preparation of an Optically-Anisotropic-Layer-Forming Composition

Components in Table 2 were mixed with each other, and the resultant mixture was stirred at 80° C. for 1 hour to yield an optically-anisotropic-layer-forming composition 1.

TABLE 2

|  | Polymerizable liquid crystal compound | Photopolymerization initiator | Levelling agent | Solvents | |
|---|---|---|---|---|---|
| Optically-anisotropic-layer-forming composition 1 | Compound A[1] (15.9%) | Irg369 (1.1%) | BYK-361N (0.01%) | Cyclopentanone (53.0%) | PGMEA (30.0%) |

In Table 2, a value in each pair of parentheses represents the content by percentage of the corresponding component in the total of the prepared composition.

In Table 2, "Irg369" represents a product, Irgacure (registered trademark) 369 manufactured by BASF Japan Ltd.; "BYK351N", a levelling agent manufactured by BYK Chemie Japan K.K.; "Compound A[1]", a compound illustrated below; and "PGMEA", propylene glycol 1-monomethyl ether 2-acetate.

Compound A[1]:

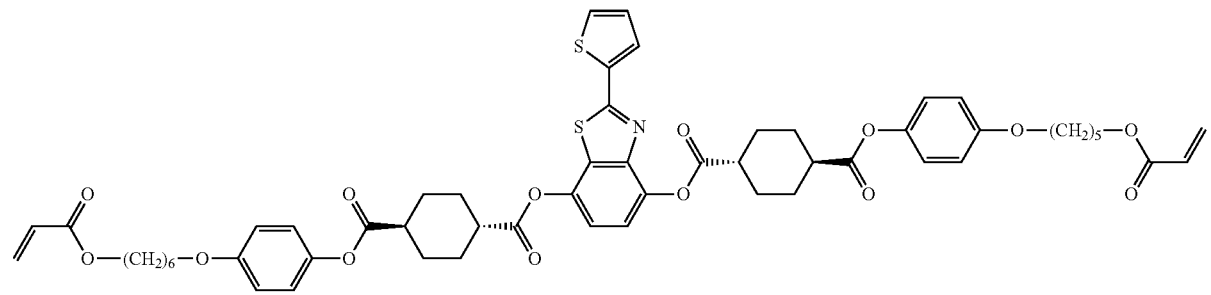

The compound A[1] was synthesized by a method described in JP-A-2010-31223.

Example 1 [Production Example 1 of a Laminated Body]

A corona treating apparatus (AGF-B10, manufactured by Kasuga Electric Works Ltd.) was used to treat a cycloolefin polymer film (substrate) (Zeonor film, manufactured by Zeon Corp.) once at a power of 0.3 kW at a treating rate of 3 m/minute.

The optically-anisotropic-layer-forming composition 1 was applied onto the resultant corona-treated surface of the cycloolefin polymer film, and the resultant workpiece was dried. A device (Unicure VB-15201BY-A, manufactured by Ushio Inc.) was used to radiate light having a wavelength of 365 nm onto the workpiece at an illuminance of 40 mW/cm² in the atmosphere of nitrogen for 30 seconds to form an optically anisotropic layer 1. In this way, a laminated body 1 was yielded.

Example 2 [Production Example 2 of a Laminated Body]

A corona treating apparatus (AGF-B10, manufactured by Kasuga Electric Works Ltd.) was used to treat a cycloolefin polymer film (substrate) (Zeonor film, manufactured by Zeon Corp.) once at a power of 0.3 kW at a treating rate of 3 m/minute.

The orienting polymer composition (A) was applied onto the resultant corona-treated surface of the cycloolefin polymer film, and the resultant workpiece was dried to form an oriented film (1) having a thickness of 40 nm. Subsequently, a bar coater was used to apply the optically-anisotropic-layer-forming composition 1 onto the outer surface of the oriented film (1). The resultant workpiece was heated to 120° C., dried and cooled to room temperature. A device (Unicure VB-15201BY-A, manufactured by Ushio Inc.) was used to radiate light having a wavelength of 365 nm onto the dried optically-anisotropic-layer-forming composition at an illuminance of 40 mW/cm² in the atmosphere of nitrogen for 30 seconds to form an optically anisotropic layer 2. In this way, a laminated body 2 was yielded.

[Optical Property Measurement]

A measuring instrument (KOBRA-WR, manufactured by a company, Oji Scientific Instruments) was used to measure the respective retardation values of the optically anisotropic layers 1 and 2. First, it was verified that their cycloolefin polymer film, which was their substrate, had neither retardation nor any slow axis. While the incident angle of light into the samples in which the optically anisotropic layers 1 and 2 were laminated, respectively, was varied, the samples were measured. In this way, it was checked whether or not their liquid crystal was vertically oriented. The retardation value R(λ) of each of the samples was the (front) retardation value at an incident angle of 0 degrees. The value $R_{50}(\lambda)$ thereof was the retardation value at an incident angle of 50 degrees (the incident light: inclined to the fast axis). These values were each measured at a wavelength (λ) of 550 nm. The average refractive index $n_0$ of the sample was 1.60, and this was used to calculate the refractive indexes $n_z$, $n_y$ and $n_x$ in accordance with the expressions (9) to (11). The results are shown in Tables 3 and 4.

TABLE 3

|  | $R_{50}$ (450) | $R_{50}$ (550) | $R_{50}$ (650) | Film thickness/ μm | $\Delta n_{50}$ (450)/ $\Delta n_{50}$ (550) | $\Delta n_{50}$ (650)/ $\Delta n_{50}$ (550) |
|---|---|---|---|---|---|---|
| Example 1 | 27.0 | 27.6 | 28.2 | 0.823 | 0.98 | 1.02 |
| Example 2 | 28.4 | 29.0 | 29.6 | 0.866 | 0.98 | 1.02 |

TABLE 4

|  | nx | ny | nz |
|---|---|---|---|
| Example 1 | 1.57 | 1.57 | 1.67 |
| Example 2 | 1.57 | 1.57 | 1.67 |

[Light Leakage Measurement]

An adhesive was used to bond, onto both surfaces of each of the laminated bodies yielded in Examples 1 and 2, polarizing plates (iodine-containing ordinary polarizing plates, TRW842AP7, manufactured by Sumitomo Chemical Co., Ltd.), respectively, to make the respective absorption axes of the polarizing plates orthogonal to each other. The transmittance of the resultant polarization-film-attached laminated body was measured, using an integrating-sphere-attached spectrometer (V7100, manufactured by JASCO Corp.). Since the substrate had no slow axis, the substrate was arranged at the polarizing plate (B) side of the laminated body, and light was radiated into the laminated body from the polarizing plate (B) side. The results are shown in Table 5.

TABLE 5

|  | T |
|---|---|
| Example 1 | 0.00090 |
| Example 2 | 0.00101 |

Example 3 [Production Example 3 of a Laminated Body]

An optically anisotropic layer 3 having a thickness of 0.523 μm was formed to yield a laminated body 3 in the same way as in Example 1 except that the used substrate was changed to a cycloolefin polymer film having a front retardation value of 120 nm.

Example 4 [Production Example 4 of a Laminated Body]

An optically anisotropic layer 4 having a thickness of 0.514 μm was formed to yield a laminated body 4 in the same way as in Example 2 except that the used substrate was changed to a cycloolefin polymer film having a front retardation value of 120 nm.

Example 5 [Production Example 5 of a Laminated Body]

An optically anisotropic layer 5 having a thickness of 0.550 μm was formed to yield a laminated body 5 in the same way as in Example 1 except that the used substrate was changed to a product (Pure-Ace MR, manufactured by Teijin Ltd.) having a front retardation value of 141 nm.

Example 6 [Production Example 6 of a Laminated Body]

An optically anisotropic layer 6 having a thickness of 0.562 μm was formed to yield a laminated body 6 in the same way as in Example 2 except that the used substrate was changed to a product (Pure-Ace WR, manufactured by Teijin Ltd.) having a front retardation value of 141 nm.

[Black Display Check]

An adhesive layer and a polarizing plate were laminated in this order onto the optically-anisotropic-layer-side surface of each of the laminated bodies 3 to 6 produced in Examples 3 to 6, respectively. At this time, the lamination was performed to make the transmission axes of the polarizing plates substantially orthogonal to the slow axis of the substrate of the laminated body (i.e., each of the laminated bodies 3 to 6). The resultant laminated-body-attached polarizing plate was bonded onto the viewing side surface of an instrument, i-Pad ((registered trademark) manufactured by Apple Inc.) from which its viewing-side polarizing plate was removed. The resultant instrument was caused to show black display. At this time, light leakage therefrom was checked from a direction of an azimuth angle of 45° and an elevation angle of 45° to the panel front surface through visual observation. The results are shown in Table 6.

TABLE 6

|  | Color omission |
|---|---|
| Example 3 | Black |
| Example 4 | Black |
| Example 5 | Black |
| Example 6 | Black |

Example 7 [Production Example 7 of a Laminated Body]

A corona treating apparatus (AGF-B10, manufactured by Kasuga Electric Works Ltd.) was used to treat a polyethylene terephthalate film (substrate) (Diafoil T140E25, manufactured by Mitsubishi Plastics, Inc.) once at a power of 0.3 kW at a treating rate of 3 m/minute. The orienting polymer composition (A) was applied onto the resultant corona-treated surface of the polyethylene terephthalate film, and the resultant workplace was dried to form an oriented film (1) having a thickness of 40 nm. Subsequently, a bar coater was used to apply the optically-anisotropic-layer-forming composition 1 onto the outer surface of the oriented film (1). The resultant workpiece was heated to 120° C., dried and cooled to room temperature. A device (Unicure VB-15201BY-A, manufactured by Ushio Inc.) was used to radiate light having a wavelength of 365 nm onto the dried optically-anisotropic-layer-forming composition at an illuminance of 40 mW/cm$^2$ in the atmosphere of nitrogen for 30 seconds to form an optically anisotropic layer 7. In this way, a laminated body 7 was yielded.

[Optical Property Measurement]

The corona treating apparatus was used to treat the outer surface of the optically anisotropic layer 7 of the laminated body 7 once at a power of 0.3 kW at a treating rate of 3 m/minute. A cycloolefin polymer film (Zeonor film, manufactured by Zeon Corp.) was laminated onto the corona-treated surface through an adhesive. Subsequently, the polyethylene terephthalate film and the oriented film were peeled to yield a laminated body 8 composed of the cycloolefin polymer film, a layer of the adhesive and the optically anisotropic layer 7.

A measuring instrument (KOBRA-WR, manufactured by a company, Oji Scientific Instruments) was used to measure the retardation value of the laminated body 8. First, it was verified that its cycloolefin polymer film, which was its substrate, had neither retardation nor any slow axis. While the incident angle of light into the sample in which the optically anisotropic layers 1 and 2 were laminated was varied, the sample was measured. In this way, it was checked whether or not its liquid crystal was vertically oriented. The retardation value $R(\lambda)$ of the sample was the (front) retardation value at an incident angle of 0 degrees. The value $R_{50}(\lambda)$ thereof was the retardation value at an incident angle of 50 degrees (the incident light: inclined to the fast axis). These values were each measured at a wavelength ($\lambda$) of 550 nm. The average refractive index no of the sample was 1.60, and this was used to calculate the refractive indexes $n_x$, $n_y$ and $n_z$ in accordance with the expressions (9) to (11). The results are shown in Tables 7 and 8.

[Light Leakage Measurement]

The corona treating apparatus was used to treat the outer surface of the optically anisotropic layer 7 of the laminated body 7 yielded in Example 7 once at a power of 0.3 kW at a treating rate of 3 m/minute. A cycloolefin polymer film (front retardation value: 120 nm) was laminated onto the corona-treated surface through an adhesive. Subsequently, the polyethylene terephthalate film and the oriented film were peeled to yield a laminated body 9 composed of a cycloolefin polymer film, a layer of the adhesive and the optically anisotropic layer 7. An adhesive was used to bond polarizing plates onto both surfaces of the laminated body 9, respectively, to make the respective absorption axes of the polarizing plates orthogonal to each other. The transmittance T at wavelengths of 550 nm of the resultant polarization-film-attached laminated body was measured, using the integrating-sphere-attached spectrometer. The result is shown in Table 9.

[Black Display Check]

An adhesive layer and a polarizing plate were laminated in this order onto the optically-anisotropic-layer-side surface of the laminated body 9 produced in Example 7. At this time, the lamination was performed to make the transmission axes of the polarizing plates substantially orthogonal to the slow axis of the substrate of the laminated body 9. The resultant laminated-body-attached polarizing plate was bonded onto the viewing side surface of an instrument, i-Pad ((registered trademark) manufactured by Apple Inc.) from which its viewing-side polarizing plate was removed. The resultant instrument was caused to show black display. At this time, light leakage therefrom was checked from a direction of an azimuth angle of 45° and an elevation angle of 45° to the panel front surface through visual observation. The result is shown in Table 10.

TABLE 7

|  | $R_{50}$ (450) | $R_{50}$ (550) | $R_{50}$ (650) | Film thickness/ μm | $\Delta n_{50}$(450)/ $\Delta n_{50}$(550) | $\Delta n_{50}$(650)/ $\Delta n_{50}$(550) |
|---|---|---|---|---|---|---|
| Example 7 | 26.4 | 26.9 | 27.4 | 0.840 | 0.98 | 1.02 |

TABLE 8

|  | nx | ny | nz |
|---|---|---|---|
| Example 7 | 1.57 | 1.57 | 1.67 |

TABLE 9

|  | T |
|---|---|
| Example 7 | 0.00103 |

TABLE 10

|  | Color omission |
|---|---|
| Example 7 | Black |

It was verified that the laminated bodies of the present invention were each excellent in light-leakage-restraining performance in the case of viewing a display device mating use of the laminated body from an oblique direction when this device shows black display.

INDUSTRIAL APPLICABILITY

The laminated body of the present invention is useful as an optical film excellent in light-leakage-restraining performance in the case of viewing a display device making use of the optical film from an oblique direction when this device shows black display.

What is claimed is:

1. A laminated body, comprising a substrate and an optically anisotropic layer, the layer satisfying the following expressions (1), (2), and (3):

$$\Delta n_{50}(450)/\Delta n_{50}(550) \leq 1.00 \qquad (1), \text{ and}$$

$$1.00 \leq \Delta n_{50}(650)/\Delta n_{50}(550) \qquad (2)$$

wherein $\Delta n_{50}(450)$, $\Delta n_{50}(550)$ and $\Delta n_{50}(650)$ represent the respective birefringences of the optically anisotropic layer that are derived from retardation values of the laminated body that are obtained by measuring the laminated body at wavelengths of 450 nm, 550 nm and 650 nm in the state of inclining the fast axis of the optically anisotropic layer at an angle of 50 degrees to act as an inclined central axis, and $$n_z > n_x \cong n_y \qquad (3)$$

wherein $n_x$ and $n_y$ represent the respective refractive indexes of the substrate in directions parallel with the plane of the substrate, these directions being orthogonal to each other, and $n_z$ represents the refractive index of the substrate in a direction orthogonal to each of the directions about $n_x$ and $n_y$, wherein when a polarizing plate (A), the laminated body and a polarizing plate (B) are stacked onto each other in this order, making the absorption axis of the polarizing plate (A) orthogonal to that of the polarizing plate (B), and further when:

(a) the substrate, which partially constitutes the laminated body, has a slow axis inside the plane thereof, and is arranged at the polarizing plate (B) side of the structure and further the substrate is stacked to make the slow axis of the substrate parallel with the absorption axis of the polarizing plate (B), or (b) the substrate, which partially constitutes the laminated body, has no slow axis inside the plane thereof, and is arranged at the polarizing plate (B) side of the structure, the transmittance T at a wavelength of 550 nm of the structure obtained when light is radiated into the structure from the polarizing plate (B) side thereof and then the resultant transmitted light is detected from the polarizing plate (A) side thereof, satisfies the following expression (D):

$$0.000 < T < 0.005 \quad (D)$$

wherein the transmittance T is a value relative to the transmittance of a stacked body of the polarizing plates (A) and (B) that is obtained when the polarizing plates (A) and (B) are arranged to make the respective axes thereof parallel with each other, this transmittance being regarded as 100%;

wherein the substrate satisfies the following expression (4):

$$n_x > n_y \cong n_z \quad (4)$$

wherein $n_x$, $n_y$ and $n_z$ have the same meanings as defined above the laminate further comprising an oriented film layer between the substrate and the optically anisotropic layer and the thickness of the oriented film layer is from 10 to 10000 nm.

2. The laminated body according to claim 1, wherein the optically anisotropic layer comprises a composition comprising a polymerizable liquid crystal compound and a photopolymerization initiator.

3. The laminated body according to claim 1, the oriented film layer comprising at least one selected from the group consisting of polyimides, polyamides and polyamic acids.

4. The laminated body according to claim 3, wherein the oriented film layer has an orientation regulating force for orienting a polymerizable liquid crystal compound vertically.

5. The laminated body according to claim 1, wherein the substrate satisfies the following expressions (5) and (6):

$$\Delta n(450)/\Delta n(550) \geq 1.00 \quad (5), \text{ and}$$

$$1.00 \geq \Delta n(650)/\Delta n(550) \quad (6)$$

wherein Δn(450), Δn(550) and Δn(650) represent the respective birefringences of the substrate that are derived from the front retardation values of the laminated body that are obtained by measuring the laminated body at wavelengths of 450 nm, 550 nm, and 650 nm.

6. The laminated body according to claim 1, wherein the substrate satisfies the following expressions (7) and (8):

$$\Delta n(450)/\Delta n(550) \leq 1.00 \quad (7), \text{ and}$$

$$1.00 \leq \Delta n(650)/\Delta n(550) \quad (8)$$

wherein Δn(450), Δn(550) and Δn(650) have the same meanings as defined above.

7. The laminated body according to claim 2, wherein the polymerizable liquid crystal compound is a compound represented by the following formula (A):

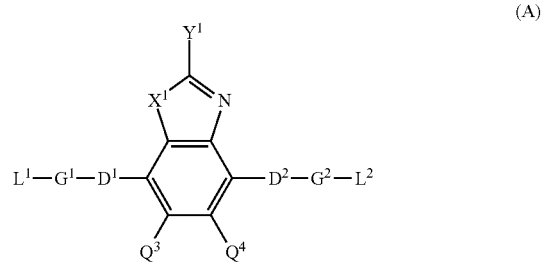

wherein $X^1$ represents an oxygen atom, a sulfur atom, or —$NR^1$— wherein $R^1$ represents a hydrogen atom, or an alkyl group having 1 to 4 carbon atoms;

$Y^1$ represents a monovalent aromatic hydrocarbon group that has 6 to 12 carbon atoms and may have a substituent, or a monovalent aromatic heterocyclic group that has 3 to 12 carbon atoms and may have a substituent;

$Q^3$ and $Q^4$ each independently represent a hydrogen atom, a monovalent aliphatic hydrocarbon group that has 1 to 20 carbon atoms and may have a substituent, an alicyclic hydrocarbon group having 3 to 20 carbon atoms, a monovalent aromatic hydrocarbon group that has 6 to 20 carbon atoms and may have a substituent, a halogen atom, a cyano group, a nitro group, or —$NR^2R^3$ or —$SR^2$ wherein $R^2$ and $R^3$ each independently represent a hydrogen atom or an alkyl group having 1 to 6 carbon atoms, or $Q^3$ and $Q^4$ may be bonded to each other to form, together with the carbon atom to which each of $Q^3$ and $Q^4$ is bonded, an aromatic ring or an aromatic heterocyclic ring;

$D^1$ and $D^2$ each independently represent a single bond, —C(=O)—O—, —C(=S)—O—, —$CR^4R^5$—, —$CR^4R^5$—$CR^6R^7$—, —O—$CR^4R^5$—, —$CR^4R^5$—O—$CR^6R^7$—, —CO—O—$CR^4R^5$—, —O—CO—$CR^4R^5$—, —$CR^4R^5$—O—CO—$CR^6R^7$—, —$CR^4R^5$—CO—O—$CR^6R^7$—, —$NR^4$—$CR^5R^6$—, or —CO—$NR^4$— wherein $R^4$s, $R^5$s, $R^6$s and $R^7$'s each independently represent a hydrogen atom, a fluorine atom, or an alkyl group having 1 to 4 carbon atoms;

$G^1$ and $G^2$ each independently represent a bivalent alicyclic hydrocarbon group having 5 to 8 carbon atoms provided that any methylene group partially constituting the alicyclic hydrocarbon group may be replaced by an oxygen atom, a sulfur atom or —NH—, and any methine group partially constituting the alicyclic hydrocarbon group may be replaced by a tertiary nitrogen atom; and $L^1$ and $L^2$ each independently represent a monovalent organic group provided that at least one of $L^1$ and $L^2$ is an organic group having a polymerizable group.

8. A polarizing plate, comprising the laminated body recited in claim 1.

9. A display device, comprising the laminated body recited in claim 1.

* * * * *